United States Patent
Kunii et al.

(10) Patent No.: US 8,379,230 B2
(45) Date of Patent: Feb. 19, 2013

(54) STORAGE DEVICE STORING IMAGE DATA IN ASSOCIATION WITH REGISTRATION INFORMATION REPRESENTING A COMMUNICATION DEVICE

(75) Inventors: Tadahiro Kunii, Nagoya (JP); Tetsuro Matsutani, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1097 days.

(21) Appl. No.: 12/333,657

(22) Filed: Dec. 12, 2008

(65) Prior Publication Data

US 2009/0153903 A1    Jun. 18, 2009

(30) Foreign Application Priority Data

Dec. 12, 2007    (JP) ................................ 2007-321399

(51) Int. Cl.
*G06F 3/12* (2006.01)

(52) U.S. Cl. .................. 358/1.1; 379/93.23; 379/93.17; 379/93.19; 348/14.01; 348/14.02; 348/14.03; 348/14.04; 348/14.05; 715/838; 715/835; 715/810; 715/765; 715/764; 715/700; 382/282; 382/283

(58) Field of Classification Search ........................ None
See application file for complete search history.

(56) References Cited

U.S. PATENT DOCUMENTS

| | | | |
|---|---|---|---|
| 5,347,628 A | 9/1994 | Brewer et al. | |
| 5,542,039 A | 7/1996 | Brinson et al. | |
| 5,545,857 A | 8/1996 | Lee et al. | |
| 6,040,831 A | 3/2000 | Nishida | |
| 6,081,266 A | 6/2000 | Sciammarella | |
| 6,292,210 B1 | 9/2001 | Gerszberg et al. | |
| 6,587,596 B1 * | 7/2003 | Haeberli | 382/283 |
| 6,850,254 B1 | 2/2005 | Banning et al. | |

(Continued)

FOREIGN PATENT DOCUMENTS

| CN | 1652565 A | 8/2005 |
|---|---|---|
| JP | H03-222033 A | 10/1991 |

(Continued)

OTHER PUBLICATIONS

Machine translation of Japanese Patent Application Publication No. 2006-093863, Jun. 2006, Muramatsu.*

(Continued)

*Primary Examiner* — Benny Q Tieu
*Assistant Examiner* — Paul F Payer
(74) *Attorney, Agent, or Firm* — Baker Botts L.L.P.

(57) ABSTRACT

An image information storage device is configured such that, when an output control unit makes the output unit output an image represented by first image data stored in an image data storage, the output control unit makes the output unit also output the registration information which has been associated with the first image data, or when the output control unit makes the output unit output first registration information stored in the registration information storage unit, the output control unit makes the output unit also output an image represented by image data which has been associated with first registration information. Further, when there is an input specifying association of the first registration information stored in the registration information storage unit with second image data, the registration control unit associates the first registration information with the first image data and the second image data, and stores in the registration information storage unit.

8 Claims, 13 Drawing Sheets

U.S. PATENT DOCUMENTS

| | | | |
|---|---|---|---|
| 7,035,865 B2 | 4/2006 | Doss et al. | |
| 7,080,324 B1 | 7/2006 | Nelson et al. | |
| 7,284,002 B2 | 10/2007 | Doss et al. | |
| 7,664,485 B2 | 2/2010 | Twerdahl et al. | |
| 7,782,244 B2 | 8/2010 | McRae | |
| 7,783,290 B2 | 8/2010 | Kim | |
| 8,064,902 B2 | 11/2011 | Kunii | |
| 8,089,389 B2 | 1/2012 | McRae | |
| 8,132,110 B1 | 3/2012 | Appelman et al. | |
| 2002/0090068 A1 | 7/2002 | Song | |
| 2002/0097262 A1 | 7/2002 | Iwase et al. | |
| 2004/0102225 A1 | 5/2004 | Furuta et al. | |
| 2004/0171394 A1 | 9/2004 | Daita | |
| 2004/0207722 A1* | 10/2004 | Koyama et al. | 348/14.02 |
| 2005/0120307 A1 | 6/2005 | Suzuki | |
| 2006/0004712 A1* | 1/2006 | Hakala et al. | 707/3 |
| 2006/0063562 A1 | 3/2006 | Hirai | |
| 2006/0135197 A1 | 6/2006 | Jin et al. | |
| 2007/0035564 A1 | 2/2007 | Katsuyama | |
| 2007/0083651 A1 | 4/2007 | Ishida | |
| 2008/0070553 A1 | 3/2008 | Yamakawa et al. | |
| 2008/0084576 A1 | 4/2008 | Dantwala | |
| 2008/0129580 A1 | 6/2008 | McRae | |
| 2008/0180304 A1 | 7/2008 | McRae | |
| 2008/0180305 A1 | 7/2008 | McRae | |
| 2008/0207231 A1 | 8/2008 | Kunii | |
| 2009/0021761 A1 | 1/2009 | Suzuki et al. | |
| 2009/0027721 A1 | 1/2009 | Misumi et al. | |
| 2009/0074159 A1 | 3/2009 | Goldfarb et al. | |
| 2009/0153885 A1 | 6/2009 | Yamaguchi et al. | |
| 2009/0153903 A1 | 6/2009 | Kunii et al. | |
| 2009/0154677 A1 | 6/2009 | Kunii et al. | |
| 2009/0168115 A1 | 7/2009 | Kunii | |
| 2010/0248703 A1 | 9/2010 | Mears et al. | |
| 2011/0074700 A1 | 3/2011 | Sharp | |
| 2011/0123009 A1 | 5/2011 | Mears et al. | |
| 2011/0161856 A1 | 6/2011 | Nurmi et al. | |

FOREIGN PATENT DOCUMENTS

| | | | |
|---|---|---|---|
| JP | H05-091179 A | 4/1993 |
| JP | H09-034392 A | 2/1997 |
| JP | H09-034483 A | 2/1997 |
| JP | H09-083630 A | 3/1997 |
| JP | 2002-232555 A | 8/2002 |
| JP | 2004-140695 A | 5/2004 |
| JP | 2004-201222 A | 7/2004 |
| JP | 2004-260657 A | 9/2004 |
| JP | 2004-304719 A | 10/2004 |
| JP | 2006-042170 A | 2/2006 |
| JP | 2006-093863 A | 4/2006 |
| JP | 2006-165821 A | 6/2006 |
| JP | 2006-222504 A | 8/2006 |
| JP | 2007-028077 A | 2/2007 |
| JP | 2007-068234 A | 3/2007 |
| JP | 2007-201906 A | 8/2007 |
| JP | 2009-147566 A | 7/2009 |

OTHER PUBLICATIONS

Machine translation of Japanese Patent Application Publication No. 2006-165821, Jun. 2006, Masuda et al.*

Japan Patent Office, Notification of Reasons for Rejection for Japanese Patent Application No. 2008-064321 (counterpart to above-captioned patent application), dispatched Jun. 8, 2010.

Japan Patent Office, Notice of Allowance for Japanese Patent Application No. 2007-321399 (counterpart to above-captioned patent application), dispatched May 31, 2011.

The State Intellectual Property Office of The People'S Republic of China; First Office Action in Chinese Patent Application No. 200810186729.7 (counterpart to the above-captioned US Patent Application) mailed on Aug. 5, 2010.

United States Patent and Trademark Office, Notice of Allowance and Fee(s) Due for U.S. Appl. No. 12/337,364, mailed Sep. 11, 2012.

* cited by examiner

| PERSONAL NUMBER | NAME | PHONE NUMBER |
|---|---|---|
| 1 | JIRO SUZUKI | 052-xxx-1111 |
| 2 | TARO KATO | 052-xxx-2222 |
| 3 | EISUKE KIMURA | 052-xxx-3333 |
| 4 | SHINJI TAKAHASHI | 052-xxx-4444 |
| 5 | DAISAKU SATO | 052-xxx-5555 |

FIG.3A

| IMAGE NAME | AREA INFORMATION | | | | PERSONAL NUMBER | |
|---|---|---|---|---|---|---|
| | X COORDINATE | Y COORDINATE | SHAPE | SIZE | | |
| FRIENDS | 7 | 5 | ELLIPSE #2 | 1.6 | 1 | (SUZUKI) |
| | 5 | 7 | CIRCLE | 1.8 | 2 | (KATO) |
| | 2 | 6 | ELLIPSE #2 | 1.3 | 3 | (KIMURA) |

FIG.3B

| IMAGE NAME | AREA INFORMATION | | | | PERSONAL NUMBER | |
|---|---|---|---|---|---|---|
| | X COORDINATE | Y COORDINATE | SHAPE | SIZE | | |
| COWORKERS | 9 | 3 | ELLIPSE #2 | 1.2 | 1 | (SUZUKI) |
| | 2 | 2 | CIRCLE | 1.5 | 4 | (TAKAHASHI) |
| | 6 | 6 | CIRCLE | 1.1 | 5 | (SATO) |

FIG.3C

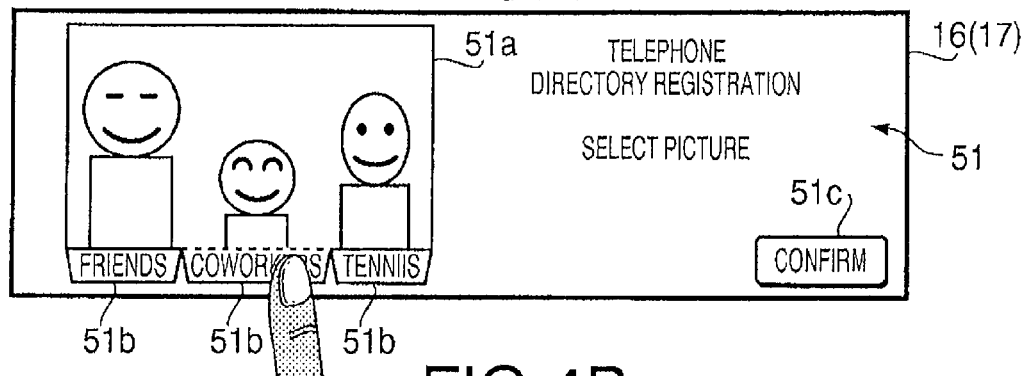
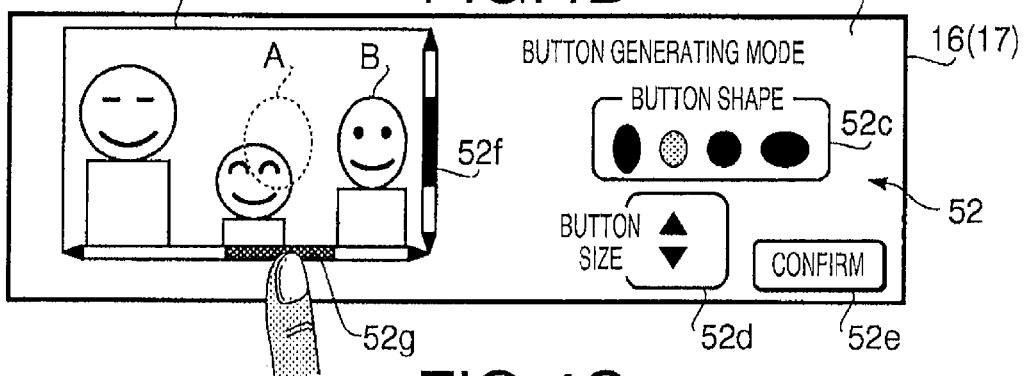
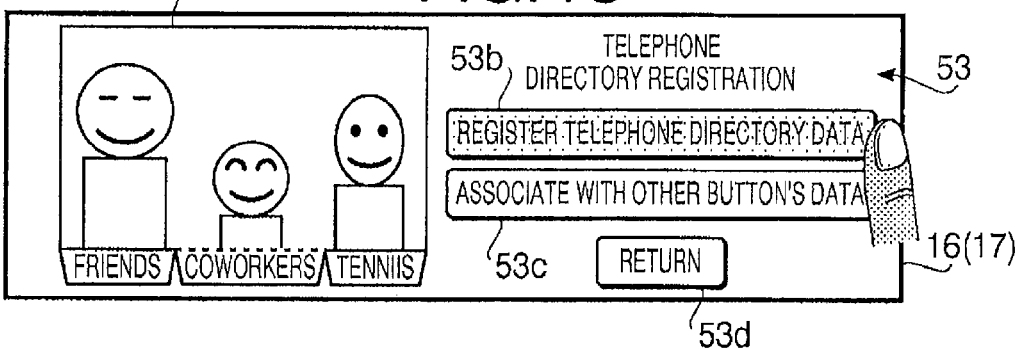
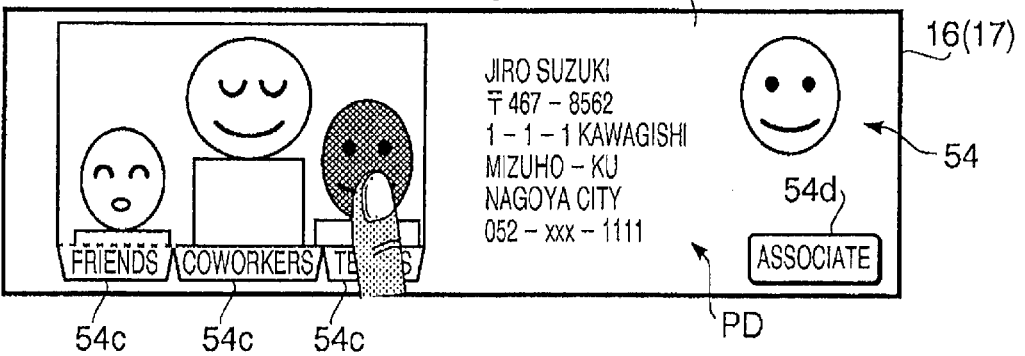

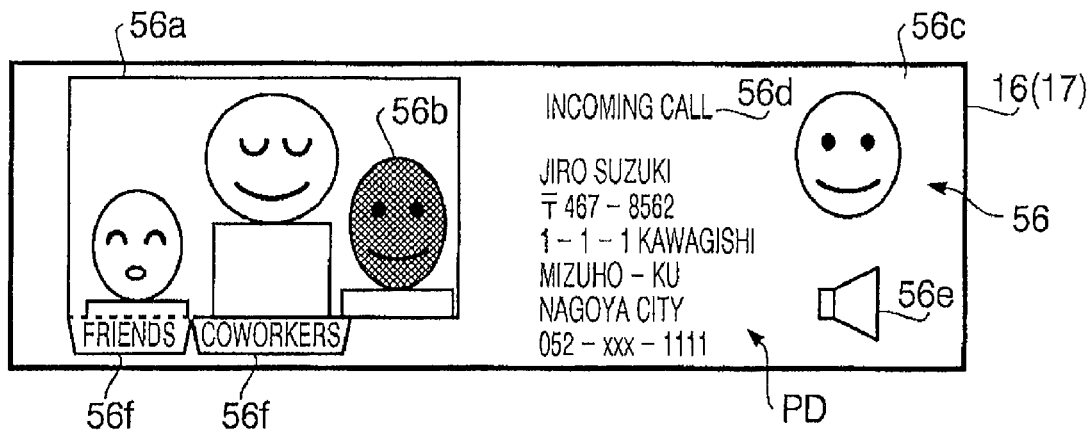
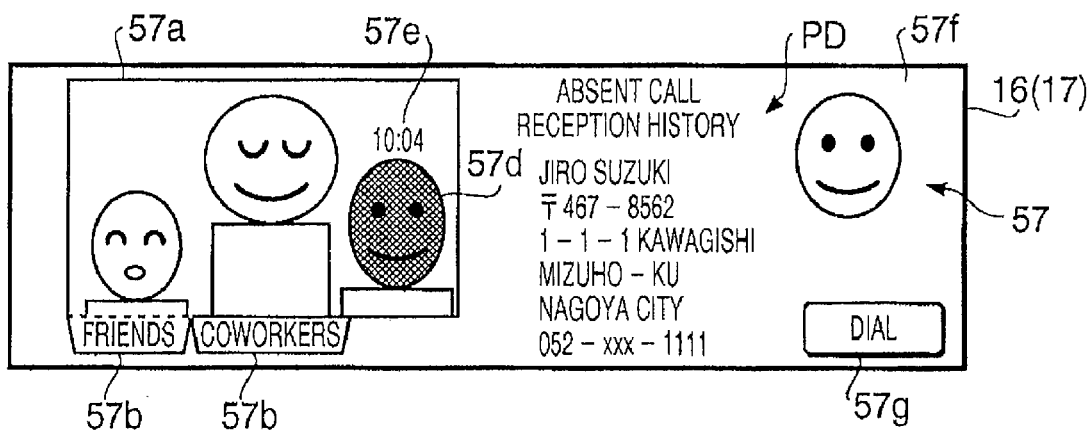
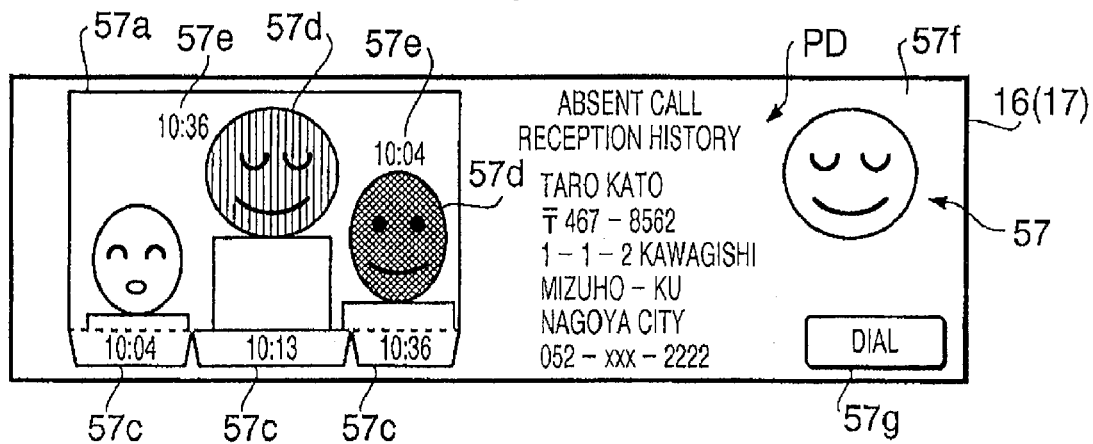

140b

R1 R2 R3 R4 R5 PD

| IMAGE NAME | AREA INFORMATION | | | | NAME | PHONE NUMBER | | PERSONAL NUMBER | |
|---|---|---|---|---|---|---|---|---|---|
| | X COORDINATE | Y COORDINATE | SHAPE | SIZE | | | | | L1 |
| FRIENDS | 7 | 5 | ELLIPSE #2 | 1.6 | JIRO SUZUKI | 052-xxx-1111 | | A1 | (SUZUKI) |
| | 5 | 7 | CIRCLE | 1.8 | TARO KATO | 052-xxx-2222 | | A2 | (KATO) |
| | 2 | 6 | ELLIPSE #2 | 1.3 | EISUKE KIMURA | 052-xxx-3333 | | A3 | (KIMURA) |

| IMAGE NAME | AREA INFORMATION | | | | NAME | PHONE NUMBER | | PERSONAL NUMBER | |
|---|---|---|---|---|---|---|---|---|---|
| | X COORDINATE | Y COORDINATE | SHAPE | SIZE | | | | | L2 |
| COWORKERS | 9 | 3 | ELLIPSE #2 | 1.2 | | | | A1 | (SUZUKI) |
| | 2 | 2 | CIRCLE | 1.5 | SHINJI TAKAHASHI | 052-xxx-4444 | | B4 | (TAKAHASHI) |
| | 6 | 6 | CIRCLE | 1.1 | DAISAKU SATO | 052-xxx-5555 | | B5 | (SATO) |

FIG.13B

STORAGE DEVICE STORING IMAGE DATA IN ASSOCIATION WITH REGISTRATION INFORMATION REPRESENTING A COMMUNICATION DEVICE

CROSS-REFERENCE TO RELATED APPLICATION

This application claims priority under 35 U.S.C. §119 from Japanese Patent Application No. 2007-321399 filed on Dec. 12, 2007. The entire subject matter of the application is incorporated herein by reference.

BACKGROUND

1. Technical Field

The present invention relates to an image information storage device, an image information processing system and a computer-readable record medium storing a program for image information processing.

2. Prior Art

Communication devices (e.g. cellular phone) having the so-called telephone directory function are widely available today. With the telephone directory function, textual information such as a name (personal name, company name, etc.) and a phone number, e-mail address, etc. corresponding to the name can be stored in a storage unit, and multiple pieces of textual information already stored in the storage unit can be successively displayed on a display unit (e.g. LCD) as needed.

For example, an electronic device described in paragraph 0007 of Japanese Patent Provisional Publication No. 2006-93863 (hereinafter referred to as a "patent document #1") has a telephone directory function of storing image data in addition to the aforementioned textual information. When a search is conducted by use of the telephone directory function, the electronic device allows the user to easily understand the relationship between a person (whose name, image data, etc. have been stored in a storage unit of the electronic device) and the user or another person based on an image (e.g. photo) including two or more subjects.

SUMMARY OF THE INVENTION

However, the electronic device of the patent document #1, in which each piece of image data is associated with a piece of information (textual information) in a one-to-one correspondence, is incapable of judging whether information associated with a piece of image data is identical with information associated with another piece of image data or not even when the two pieces of image data have been associated with the same information.

Therefore, in cases where each area cut out from a group photo (including two or more people as subjects) is associated with personal information (name, phone number, etc.), for example, the electronic device of the patent document #1 is incapable of recognizing that a person included in a group photo is identical with a person included in another group photo (even when the same person is included in the two group photos) and handles the two identical persons as different persons.

Thus, even when a user, who has acquired information on a person from a group photo, wants to search for another group photo including the person, the electronic device of the patent document #1 (which handles two persons included in different group photos as different persons as above) is incapable of assisting the user with the search. In such cases, the user has to manually search for and find another group photo (including the person) in the memory of the electronic device, which is extremely troublesome to the user.

Further, since each piece of image data is associated with a piece of information in a one-to-one correspondence in the electronic device of the patent document #1, alteration of the information has to be carried out for each piece of image data, which is also troublesome to the user. For example, even when the user just wants to change information that is common to multiple pieces of image data, the user has to carry out the task of changing the information for every piece of image data that has been associated with the information.

The present invention, which has been made in consideration of the above problems, is advantageous in that an image information storage device, an image information processing system and a computer-readable record medium storing a program for image information processing, capable of facilitating the management of the information (registration information) associated with each image and assisting the effective use of the information, can be provided.

In accordance with an aspect of the present invention, there is provided an image information storage device, which is provided with an image data storage unit which stores image data, a registration information storage unit, a registration control unit which stores registration information in the registration information storage unit while associating the registration information with the image data stored in the image data storage unit according to an input specifying the association of the registration information with the image data, and an output control unit which makes an output unit output an image and/or information. When the output control unit makes the output unit output an image represented by first image data stored in the image data storage, the output control unit makes the output unit also output the registration information which has been associated with the first image data, or when the output control unit makes the output unit output first registration information stored in the registration information storage unit, the output control unit makes the output unit also output an image represented by image data which has been associated with first registration information. Further, when there is an input specifying association of the first registration information which has already been stored in the registration information storage unit with second image data, the registration control unit associates the first registration information with the first image data and the second image data, and stores in the registration information storage unit.

With the image information storage device configured as above, when it is necessary to associate the same registration information with two or more pieces of image data, the association of the registration information with a latter piece of image data (a piece of image data with which the registration information is associated later) can be carried out by use of (the same) registration information already (previously) associated with another (former) piece of image data, by which the image information storage device is allowed to recognize the identity of the registration information associated with two or more pieces of image data. Consequently, the management of registration information can be facilitated compared to cases where each piece of registration information is separately associated with each piece of image data (in which the image information storage device is incapable of recognizing the identity of registration information associated with two or more pieces of image data).

Further, since the same (i.e. common) registration information can be associated with two or more pieces of image data, the image information storage device is capable of letting the user refer to two or more images corresponding to (associated with) a piece of registration information when the registration information is specified. Therefore, the user is allowed to easily acquire additional information which can not be acquired from the registration information alone, by viewing the two or more images. Similarly, since the image information storage device is capable of letting the user refer to registration information that is common to two or more images, the user is allowed to easily acquire additional information which can not be acquired from the images alone.

BRIEF DESCRIPTION OF THE ACCOMPANYING DRAWINGS

FIG. 3A is a schematic diagram showing an example of the configuration of data stored in a personal information memory of the MFP.

FIGS. 3B and 3C are schematic diagrams showing an example of the configuration of data stored in an image information memory of the MFP.

FIG. 4A is a schematic diagram showing a photo selection registration screen which is displayed on an LCD of the MFP when a registration process is started.

FIG. 4B is a schematic diagram showing a button generating screen which is displayed on the LCD during the execution of a button generating process.

FIG. 4C is a schematic diagram showing a registration screen which is displayed on the LCD after an area has been set in a photo by the button generating process.

FIG. 4D is a schematic diagram showing an associative registration screen which is displayed on the LCD when a button on the registration screen is touched by the user.

FIGS. 10A-10C are schematic diagrams showing examples of screens which are displayed on the LCD during the execution of a call reception process.

FIGS. 13A and 13B are schematic diagrams showing an example of the configuration of data stored in a telephone directory memory as a modification of the telephone directory memory (personal information memory, image information memory) of FIGS. 3A-3C.

DETAILED DESCRIPTION OF THE EMBODIMENTS

Figure 1:
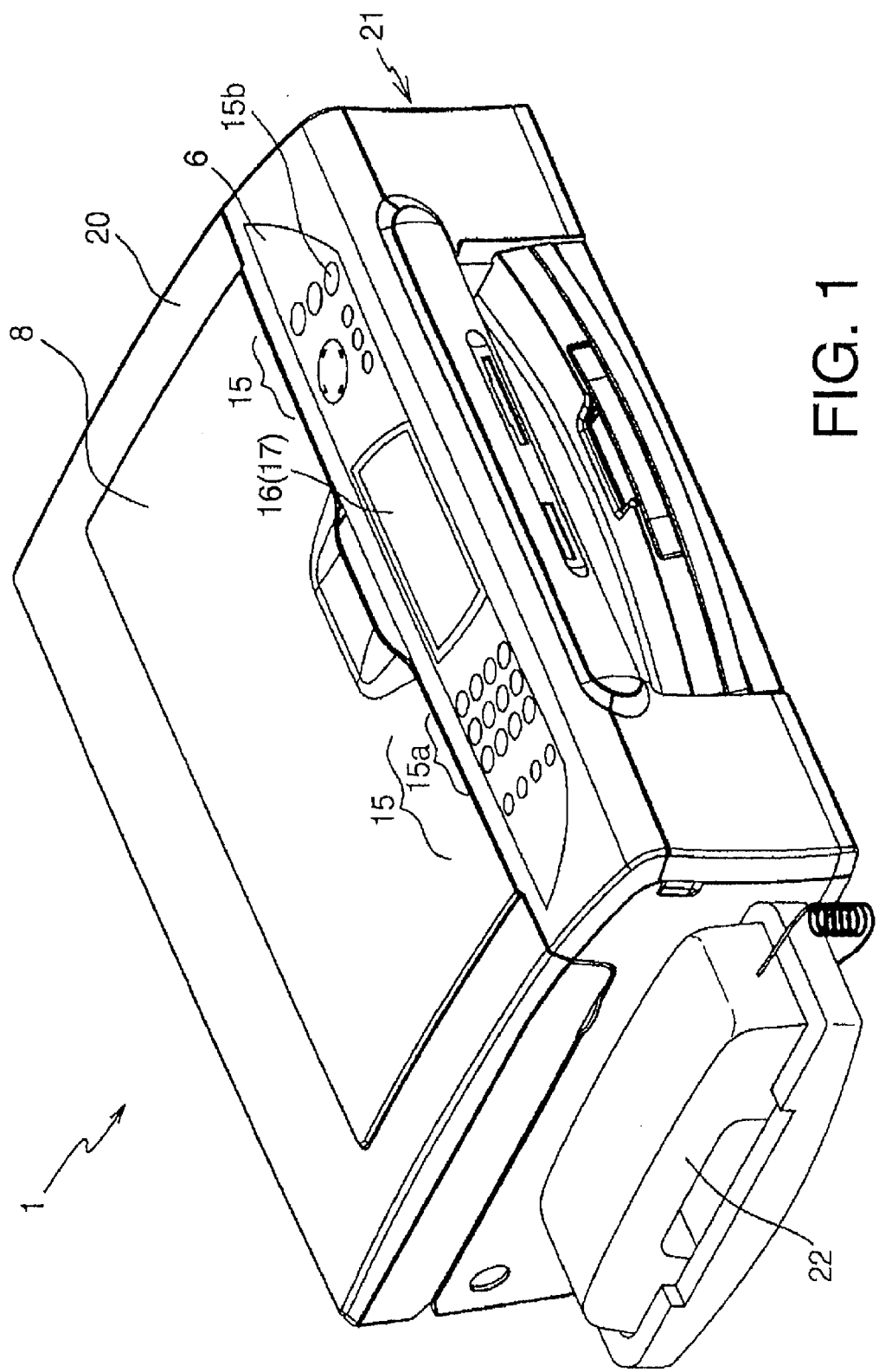
FIG. 1 is a perspective view showing the external appearance of an MFP (Multi-Function Peripheral) as an image information storage device in accordance with a first embodiment of the present invention.

Referring now to the drawings, a description will be given in detail of preferred embodiments in accordance with the present invention.

Embodiment 1

FIG. 1 is a perspective view showing the external appearance of an MFP (Multi-Function Peripheral) 1 as an image information storage device in accordance with a first embodiment of the present invention.

The MFP 1, which is connected to a telephone circuit 100 (see FIG. 2), has not only the telephone function (telephone call via the telephone circuit 100) and the facsimile function (data communication via the telephone circuit 100) but also various other functions such as the scanner function, copy function, PC print function and media print function. The MFP 1 of this embodiment is configured as a device capable of facilitating the management of registration information (which is associated with each image) and assisting the user to make effective use of the registration information (details will be explained later).

A scanner 20 for scanning a document, etc. during the execution of the facsimile function, scanner function or copy function is provided on the top of the MFP 1. A glass plate (flat bed), on which the user places a document to be scanned, is covered by a document cover 8. For the document scanning, the user opens the document cover 8 upward, places a document on the glass plate, and closes the document cover 8 to fix the document on the flat bed.

When document scanning is ordered by the user, the image on the (lower) surface of the document is scanned by a document scanning sensor (unshown) which is situated underneath the glass plate. Image data of the scanned image is stored in a prescribed storage area of a RAM 13 (see FIG. 2) which will be described later.

A printer 21 (implemented by a so-called inkjet printer) is installed in the housing of the MFP 1 as a unit for printing an image on a sheet (e.g. paper). The printer 21 is equipped with a print head (using inks of four colors CMYK (cyan, magenta, yellow, black)), a sheet feed mechanism and a recovery mechanism in order to execute color printing. The print head includes a plurality of nozzles (ink discharging holes). The printer 21 executes the printing of an image on a sheet by discharging the inks from the nozzles while feeding the sheet with the sheet feed mechanism.

An operation panel 6 in a horizontally elongated shape is situated in front of the document cover 8. The operation panel 6 includes operation keys 15, an LCD (Liquid Crystal Display) 16 and a well-known touch panel 17 which is formed integrally with the LCD 16. The operation keys 15 include various buttons such as numeric buttons 15a for inputting a phone number during the use of the telephone function or the facsimile function and a power button 15b for turning ON/OFF the power of the MFP 1.

The LCD 16 serves as a display screen for displaying a variety of images and information, such as operational instructions, the status of a process in execution and information corresponding to the pressing of the operation keys 15 and the touch panel 17.

When the telephone function or the facsimile function of the MFP 1 is used, a calling screen 55 (see FIG. 8B for example), a call reception screen 56 (see FIG. 10A for example) and an absent call reception history screen 57 (see FIG. 10B for example) can be displayed on the LCD 16. In the displaying of the calling screen 55, etc., the MFP 1 of this embodiment displays information on each person (hereinafter referred to as "personal information") already registered (stored) in a telephone directory memory 14b (see FIG. 2) and an image including the person on the LCD 16 (details will be explained later).

A handset 22, which is provided on the side face of the MFP 1, is used when the user has a telephone conversation with the other party (user of an external device which is connected to the MFP 1 via the telephone circuit 100 (see FIG. 2)) by use of the telephone function. The handset 22 is placed on a holder having a hook (unshown) when no telephone conversation is going on. For a telephone conversation, the handset 22 is lifted from the holder and used. In this embodiment, the former state of the handset 22 is referred to as an "on-hook state" and the latter state is referred to as an "off-hook state". The handset 22 is electrically connected to an NCU (Network Control Unit) 23 (see FIG. 2) when it shifts to the off-hook state and the connection with the NCU 23 is released when it shifts to the on-hook state.

Figure 2:
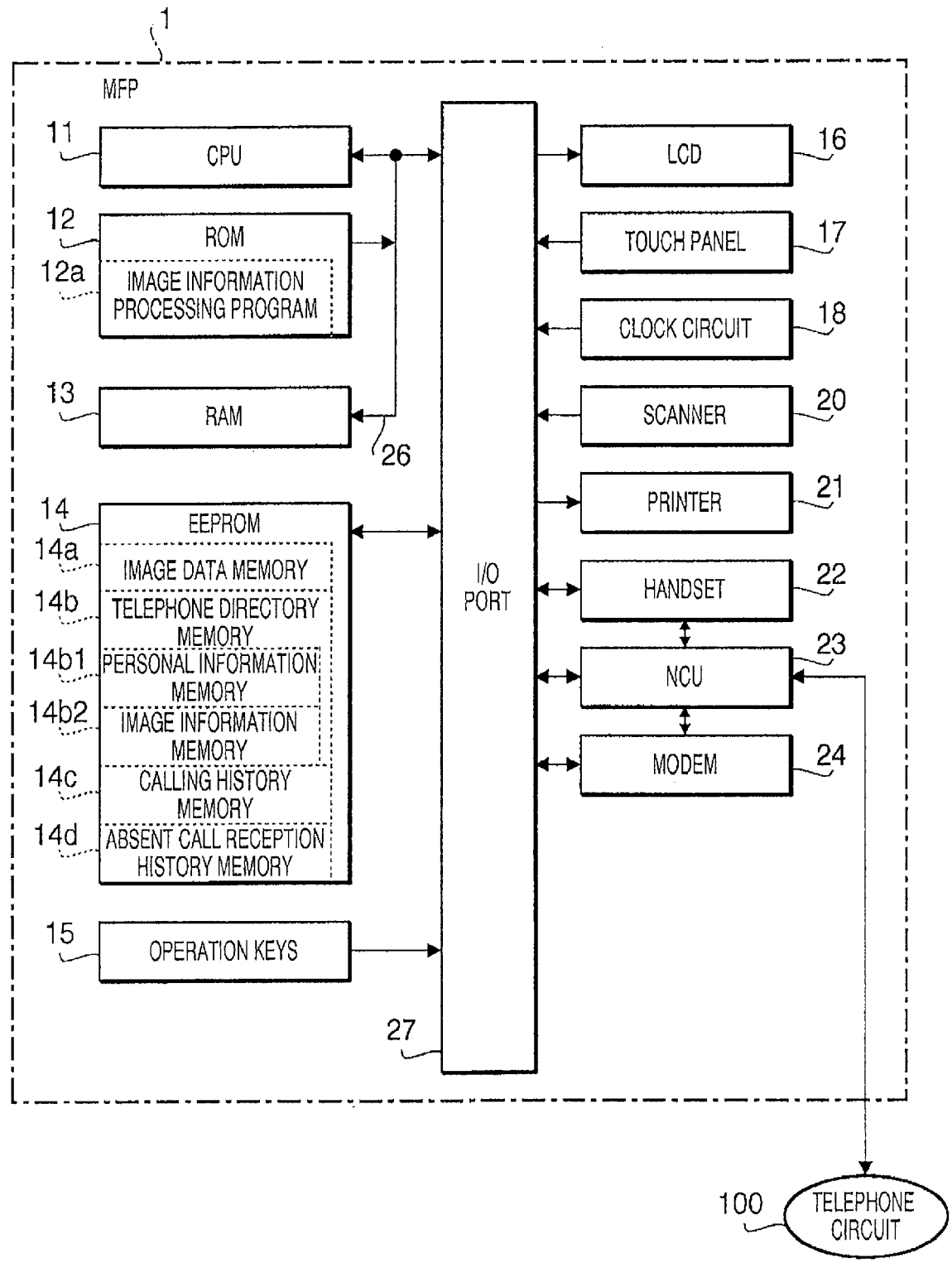
FIG. 2 is a block diagram showing an example of the electrical configuration of the MFP.

FIG. 2 is a block diagram showing an example of the electrical configuration of the MFP 1. The MFP 1 includes a CPU (Central Processing Unit) 11, a ROM (Read Only Memory) 12, a RAM (Random Access Memory) 13, an EEPROM (Electrically Erasable Programmable ROM) 14, the operation keys 15, the LCD 16, the touch panel 17, a clock circuit 18, the scanner 20, the printer 21, the handset 22, the NCU 23 and a modem 24 as its main components.

The CPU 11, the ROM 12 and the RAM 13 are connected together by a bus line 26. The EEPROM 14, the operation keys 15, the LCD 16, the touch panel 17, the clock circuit 18, the scanner 20, the printer 21, the handset 22, the NCU 23 and the modem 24 are connected to the bus line 26 via an I/O (Input/Output) port 27.

The CPU 11 controls the components connected to the I/O port 27 and the functions of the MFP 1 according to programs and data (fixed values) stored in the ROM 12 and the RAM 13 and various signals which are communicated via the NCU 23.

The ROM 12 stores a control program to be executed by the CPU 11 and fixed value data to be referred to during the execution of the control program. Incidentally, the ROM 12 has a storage area storing an image information processing program 12a for making the MFP 1 function as a device facilitating the management of the registration information associated with each image and assisting the user to make effective use of the registration information (i.e. for the execution of flow charts shown in FIG. 5, etc.). The RAM 13 is a rewritable volatile memory for temporarily storing a variety of data during various operations of the MFP 1.

The EEPROM 14 is a nonvolatile memory capable of rewritably storing data and retaining its memory contents even after the power is shut down. As shown in FIG. 2, the EEPROM 14 includes an image data memory 14a, the telephone directory memory 14b, a calling history memory 14c and an absent call reception history memory 14d.

The image data memory 14a is a storage area of the EEPROM 14 for storing image data. The image data memory 14a stores image data inputted from image pickup devices (e.g. digital camera), image data inputted from external devices (e.g. personal computer) connected to interfaces (unshown) of the MFP 1 via cables, image data read out from external media (SD Card®, Smart Media®, etc.) attached to media slots (unshown) of the MFP 1, image data of photos, etc. scanned by the scanner 20, etc.

The telephone directory memory 14b is a storage area of the EEPROM 14 for storing the so-called telephone directory. In the telephone directory, information specifying each called party (phone number, e-mail address, etc.) to be used for communication by use of the telephone function or the facsimile function is associated with information identifying the called party (name, address, etc.).

The MFP 1 of this embodiment is configured to let the user use images for the telephone directory. Thus, the telephone directory memory 14b includes a personal information memory 14b1 as a storage area for storing the personal information (name, phone number, etc.) and an image information memory 14b2 as a storage area for associating image data with the personal information stored in the personal information memory 14b1 as shown in FIG. 2. The configuration of the data stored in the personal information memory 14b1 and the image information memory 14b2 will be described later referring to FIGS. 3A-3C.

The calling history memory 14c is a storage area of the EEPROM 14 for storing history records of call origination (start of communication) made by the user by use of the telephone function of the MFP 1. Each history record stored in the calling history memory 14c (hereinafter referred to also as a "calling history record") includes the calling time (time of day of the call origination), information representing the called party (e.g. phone number), and information representing a photo (image) which was being displayed in a display area 55a of the calling screen 55 (see FIG. 8A) at the time of call origination.

The absent call reception history memory 14d is a storage area of the EEPROM 14 for storing history records of absent call reception (termination of a communication request received from outside (calling party) without starting communication). Each history record stored in the absent call reception history memory 14d (hereinafter referred to also as an "absent call reception history record") includes, for example, the time of day of the communication request and information representing the calling party (e.g. phone number) in cases where such information was acquired.

The clock circuit 18 is a well-known circuit having the clock function (keeping the current date and time). The NCU 23, which is connected to the telephone circuit 100, controls the transmission of the dialing signal to the telephone circuit 100, the response to the call signal from the telephone circuit 100, etc. The modem 24 modulates image data (specified for transmission by the facsimile function) into a signal that can be transmitted to the telephone circuit 100 and transmits the signal to the telephone circuit 100 via the NCU 23, while receiving a signal from the telephone circuit 100 via the NCU 23 and demodulating the received signal into image data that can be displayed by the LCD 16 or printed by the printer 21.

In the following, the configuration of the data stored in the personal information memory 14b1 and the image information memory 14b2 will be explained referring to FIGS. 3A-3C. FIG. 3A is a schematic diagram showing an example of the configuration of the data stored in the personal information memory 14b1. FIGS. 3B and 3C are schematic diagrams showing an example of the configuration of the data stored in the image information memory 14b2.

As shown in FIG. 3A, personal information PD (on each person who has been registered in the telephone directory) and a personal number P1 (capable of identifying each piece of personal information PD) are associated with each other in the personal information memory 14b1.

The personal information PD on a person includes information indicating the name P2 and the phone number P3 of the person, for example. The personal information PD may further include information indicating the address, e-mail address and/or characteristics of the person.

The personal number P1 is a number which is uniquely assigned to each person who has been registered in the telephone directory. The personal number P1 is stored in the personal information memory 14b1 as identification information for specifying the personal information PD on each person. While the personal numbers P1 are serial numbers starting from "1" in the example of FIG. 3A, the personal numbers P1 do not have to be serial numbers or start from "1" as long as the condition that each personal number P1 is uniquely assigned to each registered person is satisfied.

Meanwhile, in the image information memory 14b2, an image name Q1, area information Q2 and a personal number Q3 are associated together in regard to a piece of image data specified by the image name Q1 as shown in FIGS. 3B and 3C.

The image name Q1 is information specifying a piece of image data from all pieces of image data stored in the image data memory 14a. A file name, internal number, etc. which has been assigned to each piece of image data can be used as the image name Q1. Thus, a piece of image data stored in the image data memory 14a is specified by (the contents of) the image name Q1.

Thus, FIG. 3B shows the configuration of data stored in the image information memory 14b2 in regard to image data of a photo (image) "friends" stored in the image data memory 14a, and FIG. 3C shows the configuration of data stored in the image information memory 14b2 in regard to image data of a photo (image) "coworkers" stored in the image data memory 14a.

The area information Q2 is information representing an area which has been set in the drawing area of the image data specified by the image name Q1. The area information Q2 includes information indicating the shape of the area ("SHAPE"), information indicating the size of the area ("SIZE") and information indicating the position of the area in the image data ("X COORDINATE", "Y COORDINATE").

When the user of the MFP 1 of this embodiment sets a desired area in a photo (image data), the setting of the desired area is made by selecting a shape from several prepared shapes and then enlarging/reducing and moving a frame having the selected shape (details will be explained later). Thus, information representing the selected shape is stored as the "SHAPE" in the area information Q2, an enlargement/reduction scale with respect to the initial size of the area (frame) is stored as the "SIZE" in the area information Q2, and the center coordinates (X, Y) of the area are stored as the "X COORDINATE" and "Y COORDINATE" in the area information Q2.

The personal number Q3 is a number specifying a piece of personal information that is associated with the area specified by the area information Q2. The personal number Q3 is selected from the personal numbers P1 stored in the personal information memory 14b1 (FIG. 3A) and then stored in the image information memory 14b2. Thus, with the association between the personal number Q3 and the area specified by the area information Q2, the personal information PD corresponding to (associated with) the personal number Q3 (P1) in the personal information memory 14b1 is associated with the area specified by the area information Q2.

For example, in the case of FIG. 3B where the personal number "1" has been associated with an area whose "X COORDINATE", "Y COORDINATE", "SHAPE" and "SIZE" are (7, 5, ELLIPSE #2, 1.6) in the photo "friends", the personal information PD corresponding to the personal number "1" in the personal information memory 14b1 shown in FIG. 3A (i.e. the name P2 "JIRO SUZUKI" and the phone number P3 "052-xxx-1111") is associated with the area.

In the example of FIG. 3B, two more areas (other than the above area) have been set in the photo "friends", with which personal information PD specified by the personal number "2" (i.e. "TARO KATO", etc.) and personal information PD specified by the personal number "3" (i.e. "EISUKE KIMURA", etc.) have been associated, respectively. As above, the MFP 1 of this embodiment is configured so that multiple pieces of personal information PD can be associated with a piece of image data (image, photo).

Similarly, in the example of FIG. 3C, three areas have been set in the photo "coworkers", with which personal information PD specified by the personal number "1" (i.e. "JIRO SUZUKI", etc.), personal information PD specified by the personal number "4" (i.e. "SHRNJI TAKAHASHI", etc.) and personal information PD specified by the personal number "5" (i.e. "DAISAKU SATO", etc.) have been associated, respectively.

In the example of FIGS. 3B and 3C, the personal information PD on the same person specified by the personal number "1" has been associated with both the photos "friends" and "coworkers". Since the MFP 1 of this embodiment is configured so that the personal information PD can be referred to from the personal information memory 14b1 by use of the personal number Q1 (personal number P1), it is unnecessary to store a piece of corresponding (associated) personal information for each piece of image data.

Thus, with the MFP 1 of this embodiment, wastage (useless consumption) of the storage area of the EEPROM 14 can be reduced even when the same personal information is associated with multiple pieces of image data.

Further, since the actual contents of the personal information PD are stored only in the personal information memory 14b1, the management of the personal information PD can be facilitated compared to the case where a piece of corresponding (associated) personal information is stored for each piece of image data. For example, even when the same personal information has been associated with multiple pieces of image data, it is possible to change the contents of personal information associated with all pieces of image data by just changing the memory contents of the personal information memory 14b1.

In the following, a registration process, which is executed by the MFP 1 for registering an intended person in the telephone directory by associating a piece of personal information PD with an area which is set in a photo (a piece of image data), will be described referring to FIGS. 4A-7.

First, various screens which are displayed on the LCD 16 during the execution of the registration process (flow charts of FIGS. 5-7) will be explained referring to FIGS. 4A-4D.

FIG. 4A is a schematic diagram showing a photo selection registration screen 51 which is displayed first on the LCD 16 when the registration process (see FIG. 5) is started. As shown in FIG. 4A, a display area 51a capable of displaying a photo (image) is formed on the left-hand side of the photo selection registration screen 51. Tabs 51b allowing the user to select a photo to be displayed in the display area 51a are displayed under the display area 51a. The user can get a desired photo displayed in the display area 51a by touching (pressing) a tab 51b corresponding to the desired photo with a pointer (finger, stylus, etc.).

FIG. 4A shows a state in which three tabs 51b have been displayed. In this state, the user can select a desired photo (to be displayed in the display area 51a) from three photos. Since the name of the photo associated with each tab 51b ("friends", "coworkers", "tennis") is inscribed on each tab as shown in FIG. 4A, the user can make the selection of the desired photo (to be displayed in the display area 51a) while also checking the inscription on each tab 51b.

Meanwhile, a confirmation button 51c is displayed in an area on the right-hand side of the photo selection registration screen 51. When the user touches (presses) the confirmation button 51c with a pointer (finger, stylus, etc.), the photo currently displayed in the display area 51a is finalized as the photo to be associated with personal information PD.

FIG. 4B is a schematic diagram showing a button generating screen 52 which is displayed on the LCD 16 during the execution of a button generating process (FIG. 6) for setting an area (button) in the photo that should be associated with personal information PD.

As shown in FIG. 4B, a display area 52a similar to the aforementioned display area 51a is formed on the left-hand side of the button generating screen 52. Meanwhile, a shape selecting part 52c, a size specifying part 52d and a confirmation button 52e (for finalizing the aforementioned area) are displayed in an area 52b on the right-hand side of the button generating screen 52.

The shape selecting part 52c is a part for displaying multiple area shapes (button shapes) to be selectable by the user. The user can select a desired shape (area shape) for the area in the photo to be associated with personal information PD, by selecting the desired shape from the multiple shapes displayed in the shape selecting part 52c and touching the selected shape. Specifically, when a shape displayed in the shape selecting part 52c is touched (selected) by the user, a frame A in the selected shape is displayed at a prescribed position in the photo (e.g. center of the photo).

The size specifying part 52d includes two buttons for specifying enlargement and reduction of the area so that the size of the area can be changed and adjusted arbitrarily. When a button in the size specifying part 52d is operated by the user, the size of the frame A in the selected shape is enlarged or reduced, by which the size of the area (frame, button) in the photo to be associated with personal information PD can be changed and adjusted.

Vertical and horizontal scroll bars 52f and 52g are displayed to the right of and under the display area 52a, respectively. These scroll bars 52f and 52g are used for changing the position of the area (frame, button) in the photo to be associated with personal information PD.

By dragging (touching and moving) the vertical scroll bar 52f upward or downward with a pointer (finger, stylus, etc.), the user can shift the position of the frame A in the vertical direction by a distance proportional to the moving distance of the vertical scroll bar 52f.

Similarly, by dragging the horizontal scroll bar 52g rightward or leftward with a pointer, the user can shift the position of the frame A in the horizontal direction by a distance proportional to the moving distance of the horizontal scroll bar 52g.

When the user touches (presses) the confirmation button 52e after placing the frame A in the desired size at a desired position (e.g. the position of a face B shown in FIG. 4B), an area having a boundary defined by the frame A is finalized.

As described above, the MFP 1 of this embodiment is configured to let the user select the shape of the area (to be associated with personal information PD) from the button generating screen 52 (shape selecting part 52c) in the setting of the area in the photo (image), which facilitates the area setting operation by the user.

Further, the MFP 1 of this embodiment allows the user to arbitrarily set the size and position of the selected area by use of the size specifying part 52d and the scroll bars 52f and 52g displayed on the button generating screen 52, which also facilitates the area setting operation.

Figure 6:
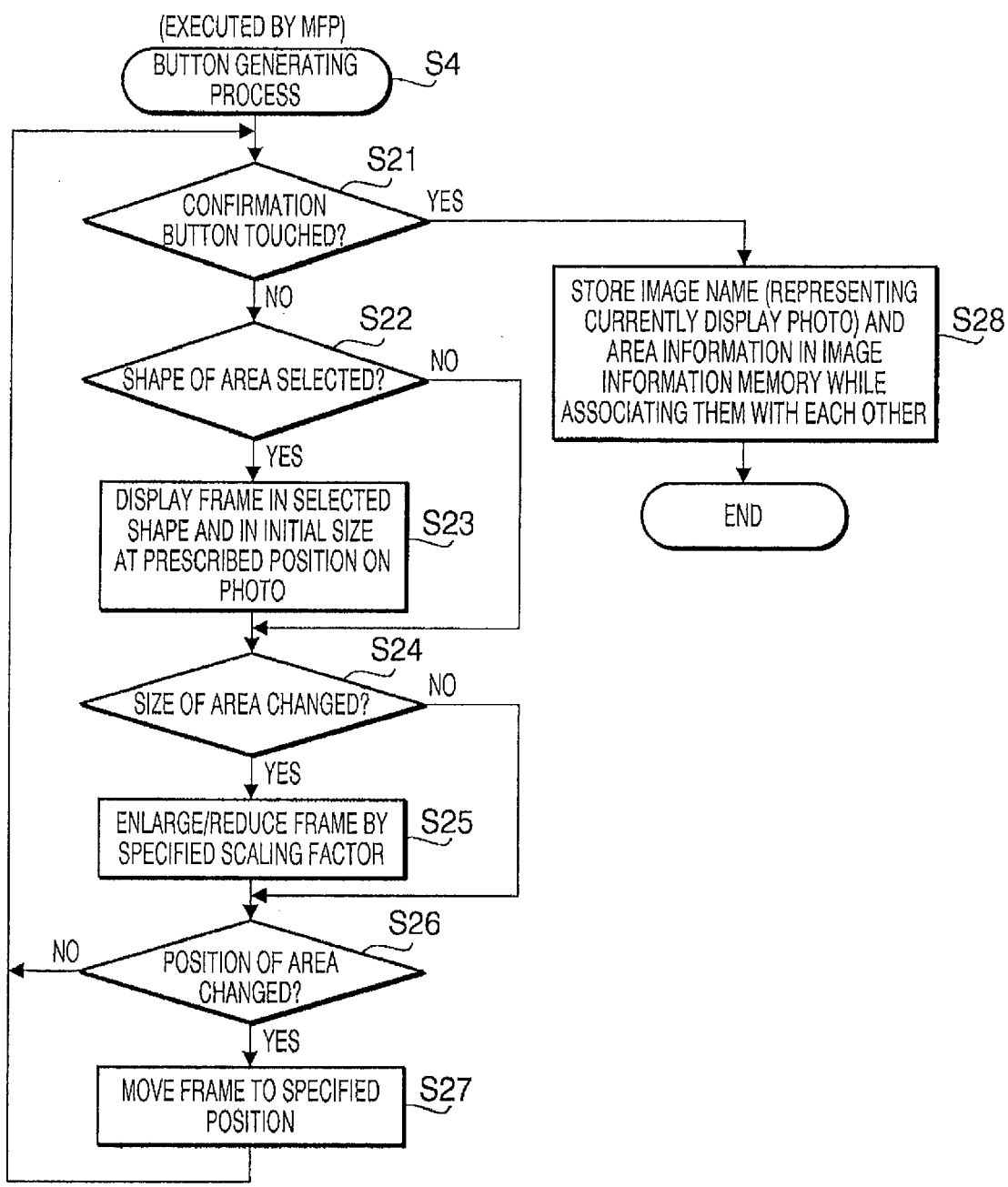
FIG. 6 is a flow chart showing a button generating process which is executed in the registration process of FIG. 5.

FIG. 4C is a schematic diagram showing a registration screen 53 which is displayed on the LCD 16 after the area has been set in the photo by the button generating process (FIG. 6). As shown in FIG. 4C, a display area 53a similar to the aforementioned display area 51a is formed on the left-hand side of the registration screen 53. In the display area 53a of the registration screen 53, the photo, in which the area to be associated with personal information PD has been set by the execution of the button generating process (FIG. 6), is displayed.

Meanwhile, a button 53b with an inscription "REGISTER TELEPHONE DIRECTORY DATA", a button 53c with an inscription "ASSOCIATE WITH OTHER BUTTON'S DATA" and a "RETURN" button 53d (for instructing the MFP 1 to return the display to the button generating screen 52 and reexecute the button generating process (FIG. 6)) are displayed in an area on the right-hand side of the registration screen 53.

When the button 53b ("REGISTER TELEPHONE DIRECTORY DATA") on the registration screen 53 is touched by the user with a pointer (finger, stylus, etc.), a personal information input screen (unshown), for letting the user input new personal information PD regarding the area (button) set in the photo, is displayed on the LCD 16. By inputting personal information PD to the personal information input screen, the personal information PD added to the personal information memory 14b1 can be associated with the area set in the photo.

When the button 53c ("ASSOCIATE WITH OTHER BUTTON'S DATA") on the registration screen 53 is touched by the user with a pointer, the user is allowed to associate personal information PD already associated with another photo (i.e. personal information PD already stored in the personal information memory 14b1) with the area (button) set in the photo (details will be explained later).

FIG. 4D is a schematic diagram showing an associative registration screen 54 which is displayed on the LCD 16 when the button 53c ("ASSOCIATE WITH OTHER BUTTON'S DATA") on the registration screen 53 is touched by the user. As shown in FIG. 4D, a display area 54a similar to the aforementioned display area 51a is formed on the left-hand side of the associative registration screen 54.

On the associative registration screen 54, tabs 54c similar to the tabs 51b (see FIG. 4A) are displayed under the display area 54a. By operating the tabs 54c, the user can select a photo other than the aforementioned photo (in which the area to be associated with personal information PD has already been set by the execution of the button generating process (FIG. 6)).

In an area 54b on the right-hand side of the associative registration screen 54, personal information PD that has been associated with an area (in the photo displayed in the display area 54a) specified by the user is displayed.

The area 54b includes an "ASSOCIATE" button 54d for finalizing the personal information PD to be associated with the area (button) set in the photo (i.e. personal information PD already associated with another photo).

By use of the associative registration screen 54, the user can associate the same personal information PD with multiple photos (multiple pieces of image data), that is, let the same personal information PD be shared by multiple photos (details will be explained later). Therefore, the association of the same personal information PD with multiple photos can be realized with ease.

Figure 5:
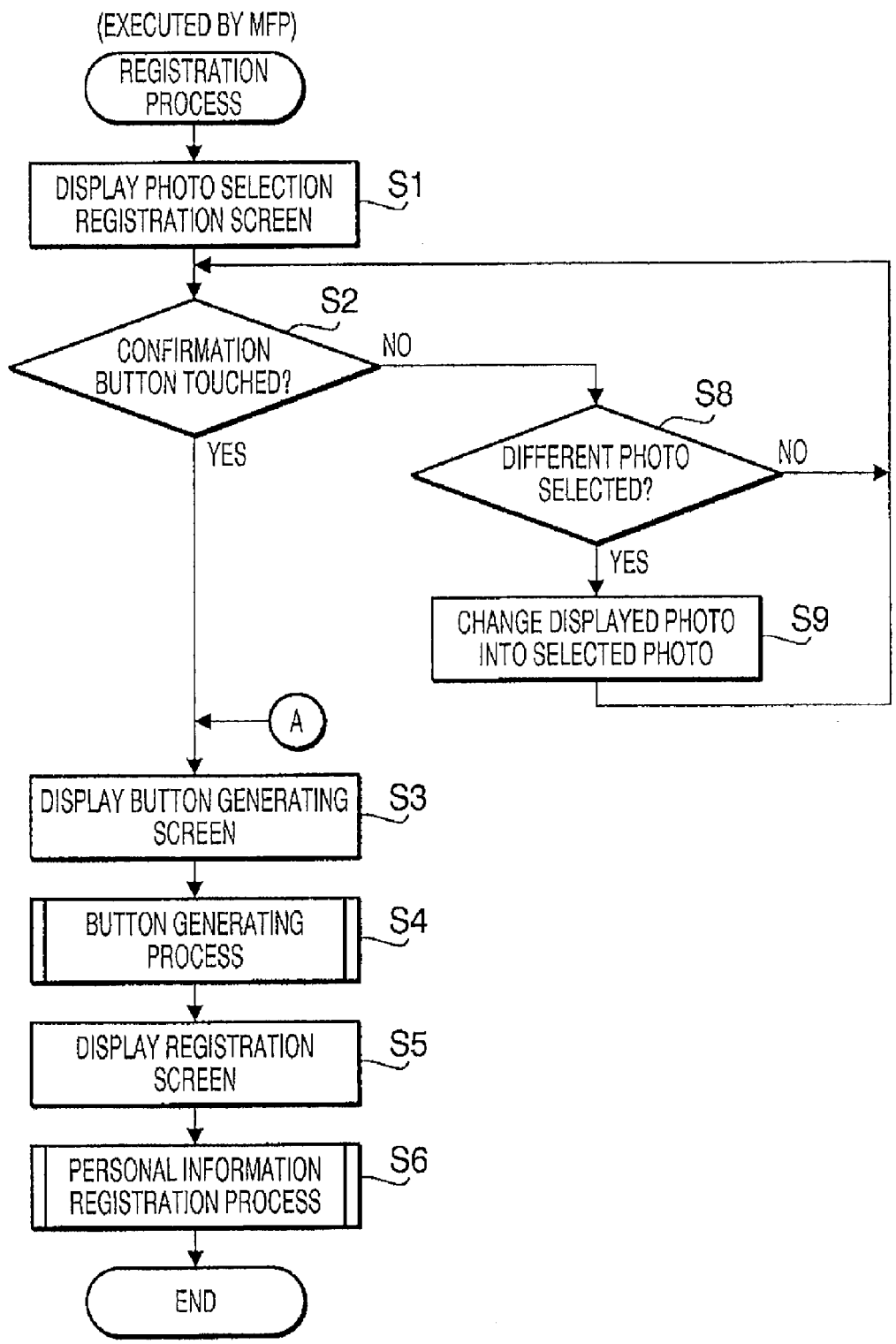
FIG. 5 is a flow chart showing the overall flow of the registration process.

In the following, the registration process, for registering an intended person in the telephone directory (telephone directory memory 14b) by associating personal information PD on the person with an area set in a photo (a piece of image data), will be described in detail referring to FIG. 5. FIG. 5 is a flow chart showing the overall flow of the registration process which is executed by the MFP 1 configured as above.

The registration process is started when an instruction for telephone directory registration is inputted by the user. At the start of the registration process, the MFP 1 displays the photo selection registration screen 51 on the LCD 16 (S1) and checks whether the confirmation button 51c on the photo selection registration screen 51 has been touched or not (S2).

When the confirmation button 51c has not been touched yet (S2: NO), the MFP 1 checks whether a different photo (image) has been selected as the photo to be displayed in the display area 51a, that is, whether the tab 51b of a photo other than the photo currently displayed in the display area 51a has been touched (S8).

When a different photo has been selected (S8: YES), the MFP 1 changes the photo displayed in the display area 51a into the selected photo (S9) and thereafter returns to the step S2. On the other hand, when no different photo has been selected in S8 (S8: NO), the MFP 1 directly returns to the step S2.

When the confirmation button 51c has been touched in S2 (S2: YES), the MFP 1 displays the button generating screen 52 on the LCD 16 instead of the photo selection registration screen 51 (S3) and then executes the button generating process (S4) for setting an area (button) in the photo to be associated with personal information PD. The details of the button generating process (S4) will be described later referring to FIG. 6.

After executing the button generating process (S4), the MFP 1 displays the registration screen 53 on the LCD 16 instead of the button generating screen 52 (S5) and then executes a personal information registration process (S6) for associating personal information PD with the area (button) which has been set by the button generating process (S4) to be associated with the personal information PD. The details of the personal information registration process (S6) will be described later referring to FIG. 7.

After executing the personal information registration process (S6), the registration process of FIG. 5 is ended since the task of associating personal information PD with a photo has been finished. As above, by the execution of the registration process (FIG. 5), personal information PD is associated with a desired area in a photo.

Next, the details of the aforementioned button generating process (S4 in FIG. 5) will be described referring to FIG. 6. FIG. 6 is a flow chart showing the button generating process (S4) which is executed in the registration process of FIG. 5. At the start of the button generating process (S4), the MFP 1 checks whether the confirmation button 52e has been touched or not (S21).

When the confirmation button 52e has not been touched yet (S21: NO), the MFP 1 checks whether the shape of the area has been selected, that is, whether a shape displayed in the shape selecting part 52c has been touched (S22).

When the shape of the area has already been selected (S22: YES), the MFP 1 displays (overlays) a frame in the selected shape and in a prescribed size (initial size) at a prescribed position (e.g. center) on the photo displayed in the display area 52a (S23) and thereafter advances to step S24. On the other hand, when the area shape has not been selected yet (S22: NO), the MFP 1 advances to the step S24 while skipping the step S23.

In the step S24, the MFP 1 checks whether the size of the area has been changed, that is, whether at least one of the buttons displayed in the size specifying part 52d has been touched. When the size of the area has been changed (S24: YES), the MFP 1 changes (enlarges/reduces) the size of the displayed frame by an amount (scaling factor) specified through the buttons of the size specifying part 52d (S25) and thereafter advances to step S26. When the size of the area has not been changed in S24 (S24: NO), the MFP 1 advances to the step S26 while skipping the step S25.

In the step S26, the MFP 1 checks whether the position of the area has been changed, that is, whether the scroll bar 52f or 52g has been moved (operated) by the user. When the position of the area has been changed (S26: YES), the MFP 1 moves the displayed frame to a position that is specified by moving direction/distance corresponding to the movement of the scroll bars 52f and 52g operated by the user (S27) and thereafter returns to the step S21. When the position of the area has not been changed in S26 (S26: NO), the MFP 1 returns to the step S21 while skipping the step S27.

When the confirmation button 52e has been touched in S21 (S21: YES), the MFP 1 stores an image name Q1 (representing the photo (image, image data) currently displayed in the display area 52a) and area information Q2 (indicating the shape, size and position of the area) in the image information memory 14b2 while associating them with each other (S28) and ends the button generating process of FIG. 6 (S4 in FIG. 5).

Figure 7:
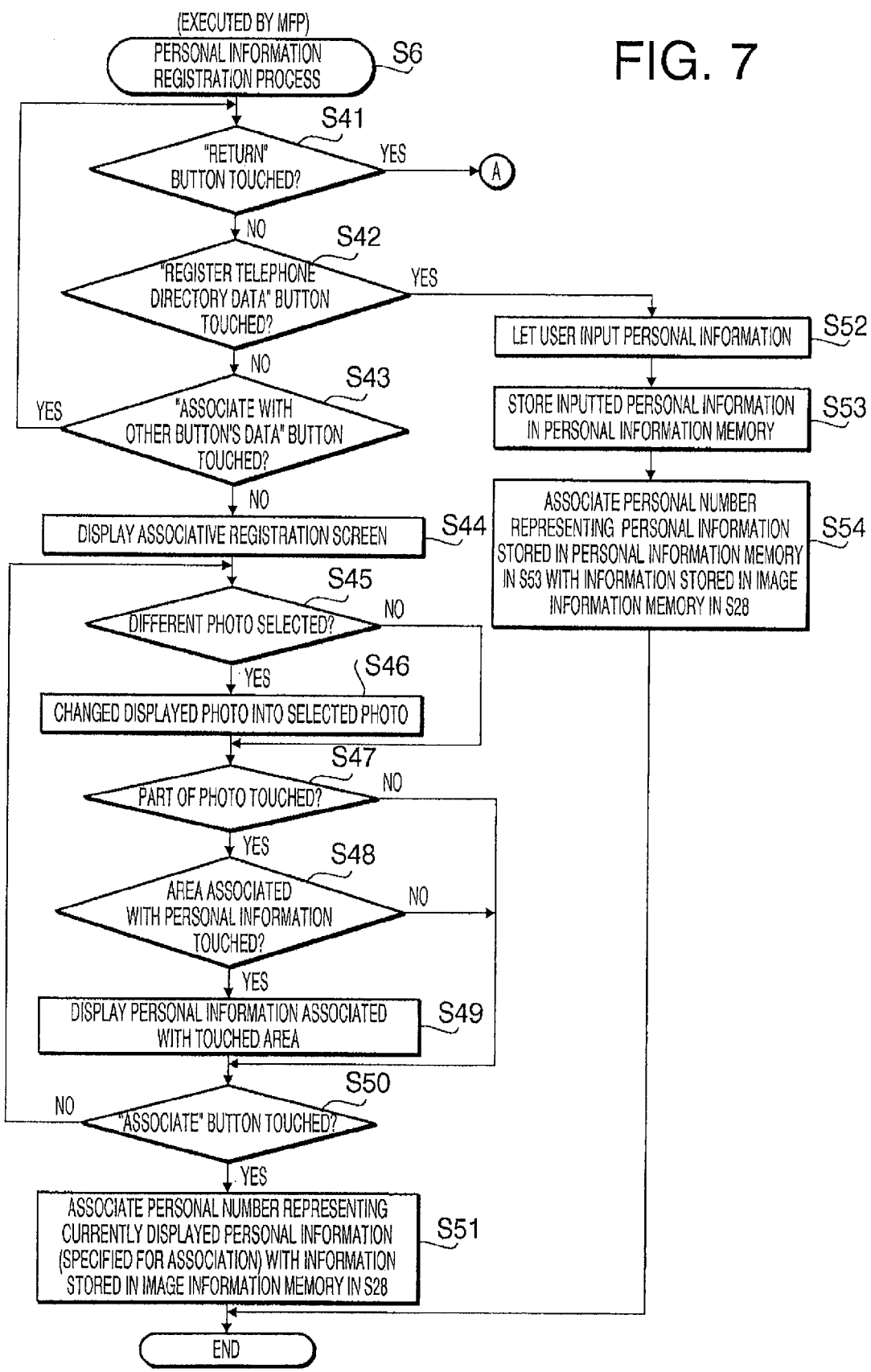
FIG. 7 is a flow chart showing a personal information registration process which is executed in the registration process of FIG. 5.

Next, the details of the aforementioned personal information registration process (S6 in FIG. 5), for associating personal information PD with the area (button) which has been set by the button generating process (S4) to be associated with the personal information PD, will be described referring to FIG. 7. FIG. 7 is a flow chart showing the personal information registration process (S6) which is executed in the registration process of FIG. 5.

At the start of the personal information registration process (S6), the MFP 1 checks whether the "RETURN" button 53d has been touched or not (S41). When the "RETURN" button 53d has been touched (S41: YES), the MFP 1 returns to the step S3 in FIG. 5.

When the "RETURN" button 53d has not been touched in S41 (S41: NO), the MFP 1 checks whether the button 53b with the inscription "REGISTER TELEPHONE DIRECTORY DATA" has been touched or not (S42).

When the button 53b ("REGISTER TELEPHONE DIRECTORY DATA") has been touched (S42: YES), the MFP 1 displays the personal information input screen (unshown), for letting the user input personal information PD in regard to the area (button) set in the photo, on the LCD 16 and thereby lets the user input the personal information PD (S52).

Subsequently, the MFP 1 stores the inputted personal information PD in the personal information memory 14b1 (S53), associates a personal number P1 representing the personal information PD stored in the personal information memory 14b1 in S53 with the information (image name Q1, area information Q2) stored in the image information memory 14b2 in S28 in FIG. 6 (S54), and ends the personal information registration process of FIG. 7 (S6).

On the other hand, when the button 53b ("REGISTER TELEPHONE DIRECTORY DATA") has not been touched in S42 (S42: NO), the MFP 1 checks whether the button 53c with the inscription "ASSOCIATE WITH OTHER BUTTON'S DATA" has been touched or not (S43). When the button 53c has not been touched (S43: NO), the MFP 1 returns to the step S41.

When the button 53c ("ASSOCIATE WITH OTHER BUTTON'S DATA") has been touched (S43: YES), the MFP 1 displays the associative registration screen 54 on the LCD 16 instead of the registration screen 53 (S44).

Subsequently, the MFP 1 checks whether a different photo (image) has been selected as the photo to be displayed in the display area 54a, that is, whether the tab 54c of a photo other than the photo currently displayed in the display area 54a has been selected (S45). When a different photo has been selected, that is, when the user intends to change the displayed photo (S45: YES), the MFP 1 changes the photo displayed in the display area 54a into the selected photo (S46) and thereafter advances to step S47. When no different photo has been selected in S45 (S45: NO), the MFP 1 advances to the step S47 while skipping the step S46.

In the step S47, the MFP 1 checks whether a part of the photo displayed in the display area 54a has been touched by the user with a pointer (finger, stylus, etc.). When a part of the photo has been touched (S47: YES), the MFP 1 checks whether an area that has been associated with personal information PD (i.e. an area whose area information Q2 has been stored in the image information memory 14b2) has been touched or not (S48).

When an area (in the photo currently displayed in the display area 54a) associated with personal information PD has been touched (S48: YES), the MFP 1 reads out the personal information PD (associated with the touched area) from the telephone directory memory 14b (personal information memory 14b1, image information memory 14b2), displays the personal information PD in the area 54b of the associative registration screen 54 (S49), and thereafter advances to step S50.

On the other hand, when a part (of the photo currently displayed in the display area 54a) not included in any area associated with personal information PD has been touched (S48: NO), the MFP 1 advances to the step S50 while skipping the step S49 since there exists no personal information PD that can be displayed in the area 54b. Also when no part of the photo displayed in the display area 54a has been touched by the user in S47 (S47: NO), the MFP 1 advances to the step S50 without executing the step S49.

In the step S50, the MFP 1 checks whether the "ASSOCIATE" button 54d on the associative registration screen 54 has been touched. When the "ASSOCIATE" button 54d has not been touched (S50: NO), the MFP 1 returns to the step S45.

When the "ASSOCIATE" button 54d has been touched in S50 (S50: YES), the MFP 1 associates the personal number P1 representing the personal information PD currently displayed in the area 54b (i.e. personal information PD specified/selected by the user for association out of all the personal information PD stored in the personal information memory 14b1) with the information (image name Q1, area information Q2) stored in the image information memory 14b2 in the step S28 in FIG. 6 (S51), and ends the personal information registration process of FIG. 7 (S6).

As a result of the step S51, personal information PD already associated with a different photo (i.e. personal information PD already stored in the personal information memory 14b1) is associated with the area in the photo which has been set in the button generating process (S4 in FIG. 5) without the need of newly storing the personal information PD in the personal information memory 14b1. Therefore, the personal information memory 14b1 is prevented from storing personal information PD on the same person redundantly, by which wastage (useless consumption) of the storage area of the EEPROM 14 can be reduced.

Figure 8A:
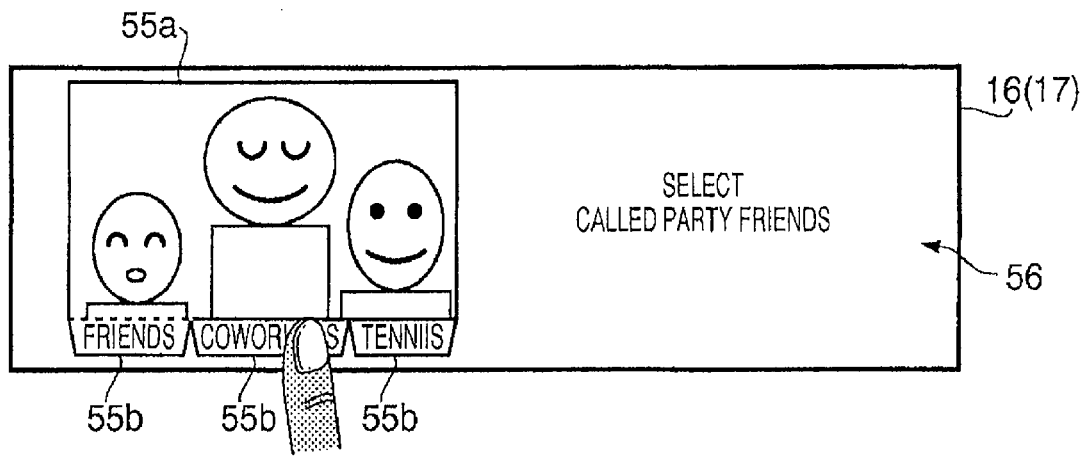
FIGS. 8A-8C are schematic diagrams showing examples of a calling screen which is displayed on the LCD during the execution of a calling process.
Figure 8B:
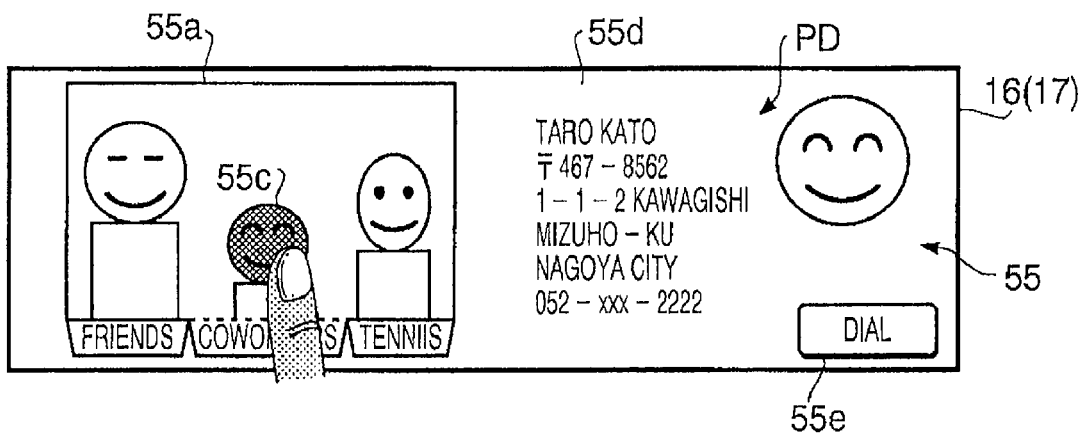
Figure 8C:
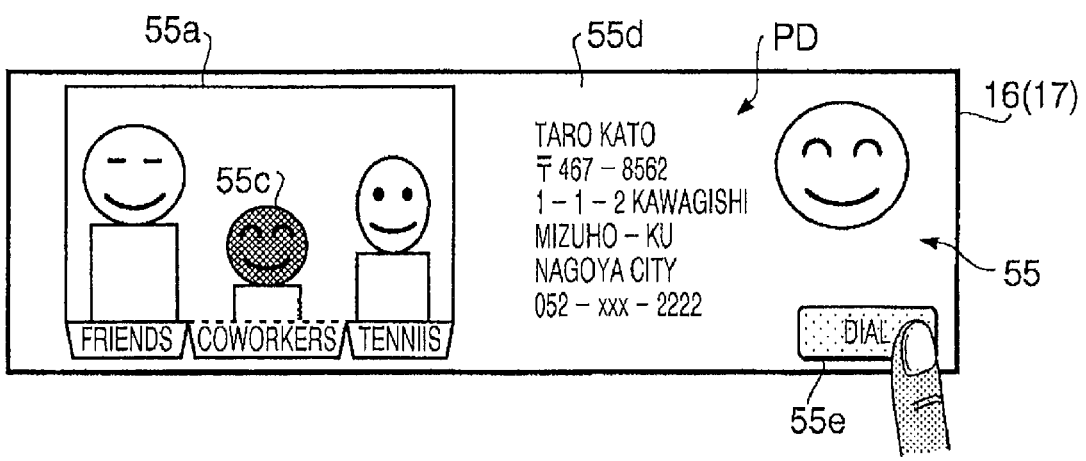

In the following, a case where the user makes a phone call to a person (called party) by use of the telephone directory stored in the telephone directory memory 14b will be explained referring to FIGS. 8A-8C and FIG. 9. First, the calling screen 55, which is displayed on the LCD 16 during the execution of a calling process (flow chart of FIG. 9), will be explained referring to FIGS. 8A-8C. FIGS. 8A-8C are schematic diagrams showing examples of the calling screen 55.

FIG. 8A shows a status of the calling screen 55 when the user selects a photo that includes desired personal information PD. A display area 55a capable of displaying a photo (image) is formed on the left-hand side of the calling screen 55, in which a photo selected by the user is displayed. Tabs 55b allowing the user to select a photo to be displayed in the display area 55a are displayed under the display area 55a. The user can get a desired photo (including an intended called party) displayed in the display area 55a by touching a tab 55b corresponding to the desired photo with a pointer (finger, stylus, etc.).

FIG. 8B shows a status of the calling screen 55 when an area (button in the photo currently displayed in the display area 55a) that has been associated with personal information PD on the intended called party has been touched by the user. When an area already associated with personal information PD (e.g. area 55c shown in FIG. 8B) is touched, the touched area (e.g. 55c) is highlighted (blinked) to let the area be distinguishable from other areas.

In the case where an area already associated with personal information PD (e.g. area 55c) is touched by the user, the personal information PD associated with the touched (selected) area is displayed in an area 55d on the right-hand side of the calling screen 55, together with a dialing button 55e for dialing the phone number included in the personal information PD displayed in the area 55d.

FIG. 8C shows a status of the calling screen 55 when the person having the personal information PD currently displayed in the area 55d (i.e. the person associated with the area 55c in the photo currently displayed in the display area 55a) is determined as the called party and the dialing is carried out. As shown in FIG. 8C, the user can originate the call to the called party (associated with the selected area 55c) by touching the dialing button 55e being displayed in the area 55d together with the personal information PD.

Figure 9:
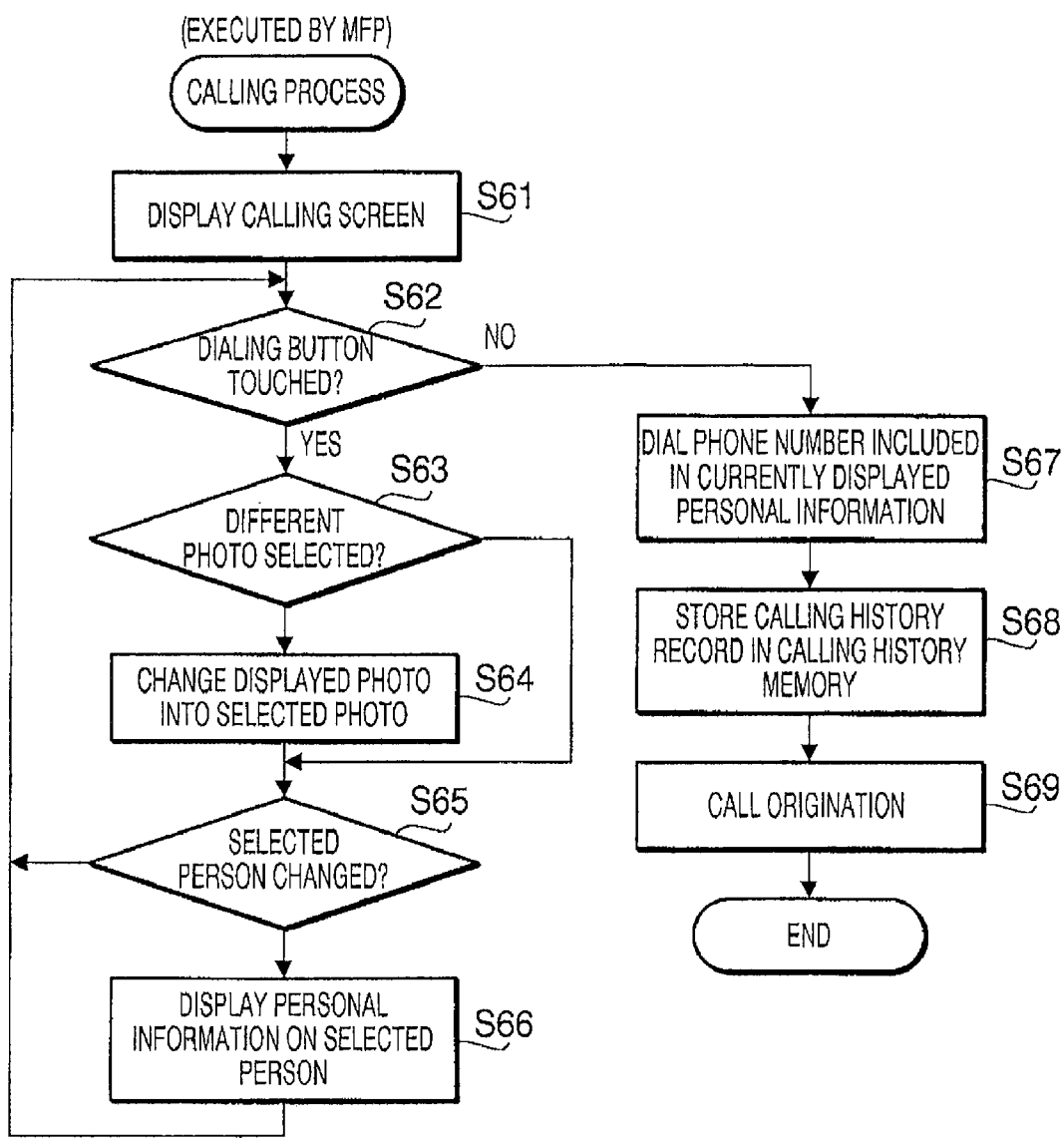
FIG. 9 is a flow chart showing the calling process executed by the MFP.

Next, the details of the calling process, for originating a call to a called party selected from the telephone directory, will be explained referring to FIG. 9. FIG. 9 is a flow chart showing the calling process which is executed by the MFP 1. The calling process is started when an instruction for selecting a telephone mode of the MFP 1 is inputted by the user. At the start of the calling process, the MFP 1 displays the calling screen 55 on the LCD 16 (S61) and checks whether the dialing button 55e on the calling screen 55 has been touched by the user or not (S62).

When the dialing button 55e has not been touched (S62: NO), the MFP 1 checks whether a different photo has been selected by the user as the photo to be displayed in the display area 55a, that is, whether a tab 55b of a photo other than the photo currently displayed in the display area 55a has been selected by the user (S63).

When a different photo has been selected, that is, when the user intends to change the displayed photo (S63: YES), the MFP 1 changes the photo displayed in the display area 55a into the selected photo (S64) and thereafter advances to step S65. When no different photo has been selected in S63 (S63: NO), the MFP 1 advances to the step S65 while skipping the step S64.

In the step S65, the MFP 1 checks whether the selected person has been changed, that is, whether a different area (button) in the photo has been touched. When the selected person has been changed (S65: YES), the MFP 1 reads out personal information PD on the currently selected person (i.e. personal information PD associated with the selected area) from the telephone directory memory 14b (personal information memory 14b1, image information memory 14b2), displays the personal information PD in the area 55d of the calling screen 55 (S66), and returns to the step S62.

On the other hand, when the selected person has not been changed in S65, that is, when no other area in the photo has been touched (S65: NO), the MFP 1 directly returns to the step S62.

When the dialing button 55e has been touched in S62 (S62: NO), the MFP 1 dials the phone number P3 included in the personal information PD currently displayed in the area 55d (i.e. personal information PD associated with the area 55c selected by the user) (S67). Subsequently, the MFP 1 stores the calling time (time of day of the call origination), the phone number (as the information representing the called party) and information representing the photo (image) currently displayed in the display area 55a (at the time of call origination) in the calling history memory 14c as a calling history record (S68), starts the call origination (S69), and ends the calling process of FIG. 9.

As described above, in the calling process executed by the MFP 1 of this embodiment, the user is allowed to determine the called party while referring to a photo (image) displayed on the LCD 16 (specifically, in the display area 55a of the calling screen 55). Since the selection input of the called party can be made based on the photo displayed on the LCD 16, the user starting the communication can select a person who is suggested by the photo as a called party, by which the user is allowed to start the communication after having a good grasp of information on the called party.

In the following, a case where the MFP 1 (receiving a phone call) informs the user of the calling party (sending a communication request) by use of a photo stored (registered) in the telephone directory memory 14b will be explained referring to FIGS. 10A-10C and FIG. 11. First, screens which are displayed on the LCD 16 during the execution of a call reception process (flow chart of FIG. 11) will be explained referring to FIGS. 10A-10C. FIGS. 10A-10C are schematic diagrams showing examples of the screens displayed on the LCD 16 during the execution of the call reception process (FIG. 11) which will be explained later.

FIG. 10A shows an example of the call reception screen 56 which is displayed on the LCD 16 when a communication request (incoming call) is received by the MFP 1. As shown in FIG. 10A, a display area 56a capable of displaying a photo (image) is formed on the left-hand side of the call reception screen 56.

Figure 11:
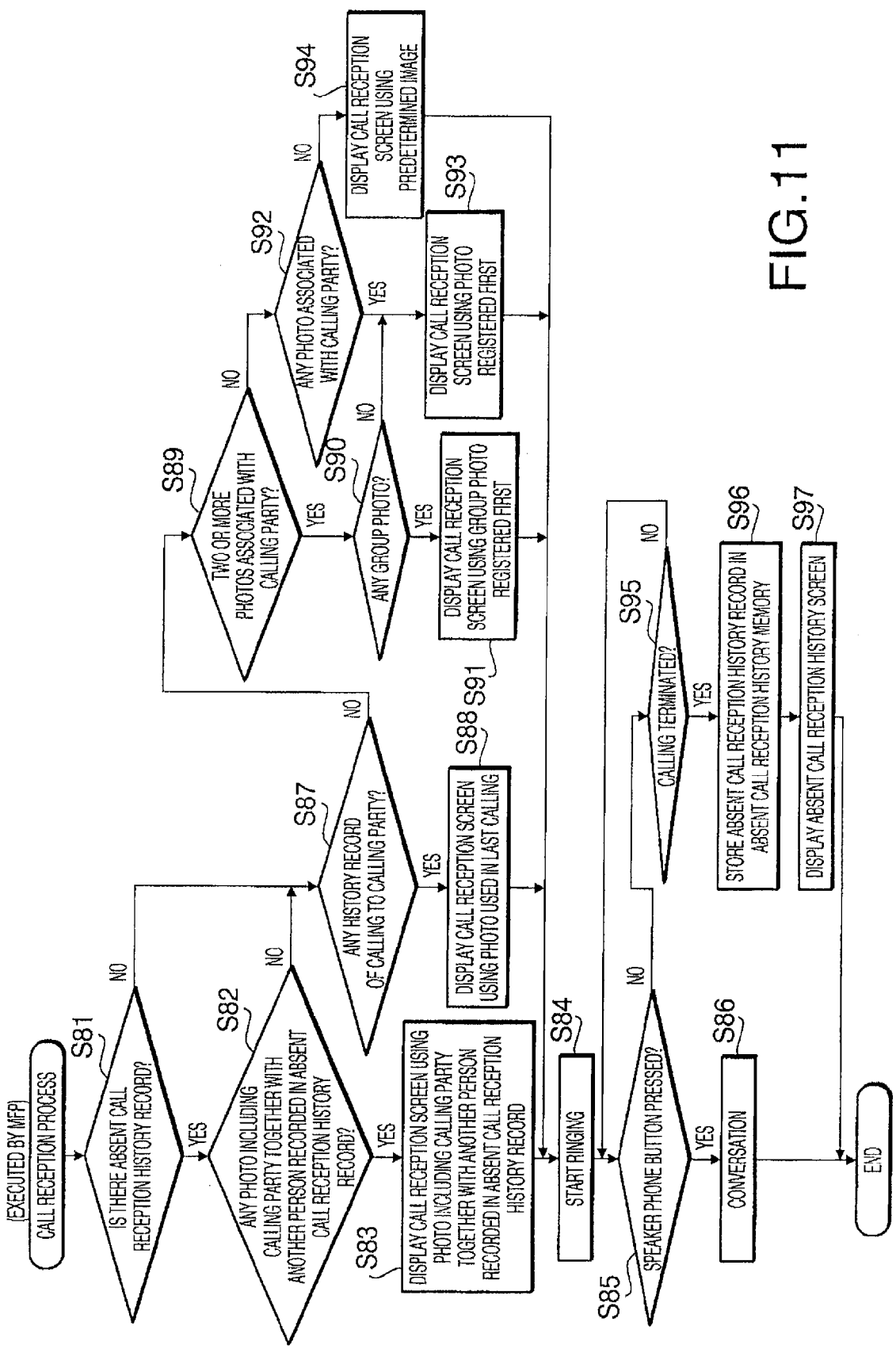
FIG. 11 is a flow chart showing the call reception process executed by the MFP.

In the case where a communication request is received, a photo that is selected according to preset rules is displayed in the call reception process of FIG. 11 (details will be explained later). In this case, if the calling party (sender of the communication request) is a person already stored (registered) in the telephone directory memory 14b, an area (in the displayed photo) that has been associated with the personal information PD on the calling party (e.g. area 56b) is highlighted (blinked) to let the area be distinguishable from other areas.

Further, a message 56d saying "INCOMING CALL" and a speaker phone button 56e (for requesting line connection) are displayed in an area 56c on the right-hand side of the call reception screen 56. If the calling party (sender of the communication request) has already been stored (registered) in the telephone directory memory 14b, the personal information PD on the calling party is also displayed in the area 56c. When the speaker phone button 56e on the call reception screen 56 is touched by the user, the line is connected, by which the communication with the calling party is made possible.

Incidentally, when there are two or more photos including the calling party, two or more tabs 56f (inscribed with the photo names of the photos including the calling party) are displayed so as to let the user select and change the photo displayed in the display area 56a. Therefore, the user can start the telephone conversation with the calling party after having a good grasp of information on the calling party by properly changing the photo displayed in the display area 56a (i.e. by properly touching the tabs 56f).

FIGS. 10B and 10C show examples of the absent call reception history screen 57 which indicates the status of the absent call reception history. Specifically, FIG. 10B shows a case where only one absent call reception history record has been stored in the absent call reception history memory 14d and FIG. 10C shows a case where two or more absent call reception history records have been stored in the absent call reception history memory 14d.

As shown in FIGS. 10B and 10C, a display area 57a capable of displaying a photo (image) is formed on the left-hand side of the absent call reception history screen 57. Under the display area 57a, tabs 57b (in FIG. 10B) or tabs 57c (in FIG. 10C) are displayed. The user can select the photo to be displayed in the display area 57a by touching one of the tabs.

In the case of FIG. 10B where there is only one absent call reception history record, a photo name is inscribed on each tab 57b. When there are two or more photos including the calling party recorded in the absent call reception history record, two or more tabs 57b inscribed with the photo names of the photos are displayed. The user is allowed to acquire a lot of information on the calling party recorded in the absent call reception history record by properly changing the photo displayed in the display area 57a (i.e. by properly touching the tabs 57b).

In the case of FIG. 10C where there are two or more absent call reception history records, call reception time (time of day of call reception) is inscribed on each tab 57c. Incidentally, when there exists a photo that includes two or more calling parties recorded in the absent call reception history records, two or more tabs 57c are associated with a photo as shown in FIG. 10C.

In such cases where a photo is displayed in the display area 57a of the absent call reception history screen 57, each area 57d associated with a calling party recorded in an absent call reception history record is highlighted (blinked) to let the area be distinguishable from other areas, and the call reception time 57e is displayed in the vicinity of the area 57d as shown in FIGS. 10B and 10C.

Meanwhile, in an area 57f on the right-hand side of the absent call reception history screen 57, personal information PD representing a calling party is displayed. When there are two or more absent call reception history records, a piece of personal information PD associated with a photo and an area selected by the user is displayed in the area 57f. The area 57f includes a dialing button 57g for dialing the phone number included in the personal information PD displayed in the area 57f. The user can originate a call to the "calling party" (whose personal information PD is currently displayed in the area 57f) by touching the dialing button 57g being displayed in the area 57f together with the personal information PD.

Next, the details of the call reception process, which is executed in response to a communication request, will be explained referring to FIG. 11. FIG. 11 is a flow chart showing the call reception process which is executed by the MFP 1. The call reception process is started when a communication request is received from (a communication device of) a calling party. At the start of the call reception process, the MFP 1 checks whether there exists an absent call reception history record which has been stored in the absent call reception history memory 14*d* (S81).

When there exists an absent call reception history record (S81: YES), the MFP 1 checks whether a photo including the calling party (sender of the communication request) together with another person who has been recorded in an absent call reception history record has been registered in the telephone directory memory 14*b* (image information memory 14*b*2) (S82).

When a photo including the calling party together with another person recorded in an absent call reception history record has been registered in the telephone directory memory 14*b* (S82: YES), the MFP 1 displays the call reception screen 56 on the LCD 16 by use of the photo (including the calling party and another person recorded in an absent call reception history record) (S83). In the photo displayed in the display area 56*a* of the call reception screen 56, an area associated with the calling party is highlighted (blinked) to let the area be distinguishable from other areas (see FIG. 10A).

When no absent call reception history record has been stored in the absent call reception history memory 14*d* in S81 (S81: NO) or when no photo, including the calling party together with another person recorded in an absent call reception history record, has been registered in the telephone directory memory 14*b* in S82 (S82: NO), the MFP 1 checks whether a calling history record indicating a calling to the calling party (sender of the communication request) has been stored in the calling history memory 14*c* (S87).

When there exists such a calling history record in the calling history memory 14*c* (S87: YES), the MFP 1 displays the call reception screen 56 on the LCD 16 by use of a photo that was used in the last calling (latest calling) among such calling history records stored in the calling history memory 14*c* (S88). In the photo displayed in the display area 56*a* of the call reception screen 56, an area associated with the calling party is highlighted (blinked) to let the area be distinguishable from other areas (see FIG. 10A).

On the other hand, when no such calling history record (indicating a calling to the calling party sending the communication request) exists in the calling history memory 14*c* in S87 (S87: NO), the MFP 1 checks whether there are two or more photos associated with the calling party in the telephone directory memory 14*b* (image information memory 14*b*2) (S89).

When there are two or more photos associated with the calling party (S89: YES), the MFP 1 checks whether a group photo (including two or more people as subjects) is included in the photos associated with the calling party (S90).

When the photos associated with the calling party include one or more group photos (S90: YES), the MFP 1 displays the call reception screen 56 on the LCD 16 by use of one of the group photos that was stored (registered) in the telephone directory memory 14*b* first (S91). In the photo displayed in the display area 56*a* of the call reception screen 56, an area associated with the calling party is highlighted (blinked) to let the area be distinguishable from other areas (see FIG. 10A).

On the other hand, when no group photo is included in the photos associated with the calling party (S90: NO), the MFP 1 displays the call reception screen 56 on the LCD 16 by use of one of the photos (associated with the calling party) that was stored in the telephone directory memory 14*b* first (S93). In the photo displayed in the display area 56*a*, an area associated with the calling party is highlighted (blinked) to let the area be distinguishable from other areas (see FIG. 10A).

When there are not two or more photos associated with the calling party in S89 (S89: NO), the MFP 1 checks whether there exists a photo associated with the calling party in the telephone directory memory 14*b* (S92).

When at least one photo associated with the calling party exists in the telephone directory memory 14*b* (S92: YES), the MFP 1 displays the call reception screen 56 on the LCD 16 by use of one of the photos (associated with the calling party) that was stored in the telephone directory memory 14*b* first (S93). In the photo displayed in the display area 56*a*, an area associated with the calling party is highlighted (blinked) to let the area be distinguishable from other areas (see FIG. 10A).

On the other hand, when no photo associated with the calling party exists in the telephone directory memory 14*b* (S92: NO), the MFP 1 displays the call reception screen 56 on the LCD 16 by use of an image which has been predetermined irrespective of the calling party (e.g. an image including a human-shaped icon and a character string "NO DATA") (S94).

As above, when a communication request is received, a photo selected according to preset rules is displayed in the display area 56*a* of the call reception screen 56 by the steps S81-S83 and S87-S94. Thus, the user can acquire additional information on the calling party with ease, by viewing the whole of the photo displayed in the display area 56*a*.

In cases where the photo (image) displayed in the display area 56*a* is a photo including the calling party, an area corresponding to (associated with) the calling party (area 56*b* in FIG. 10A) is highlighted (blinked) to let the area be distinguishable from other areas, by which the calling party is emphasized in the photo. Since the area associated with the calling party stands out from the photo which is displayed upon reception of the communication request, the user can visually recognize the calling party in the photo with ease.

After finishing the step S83, S88, S91, S93 or S94, the MFP 1 starts ringing (S84) and then checks whether the speaker phone button 56*e* has been touched or not (S85). When the speaker phone button 56*e* has been touched (S85: YES), the MFP 1 enables the telephone conversation by connecting the line (S86) and ends the call reception process of FIG. 11.

When the speaker phone button 56*e* has not been touched in S85 (S85: NO), the MFP 1 checks whether the calling (communication request) from the calling party has terminated or not (S95).

When the calling from the calling party has not terminated (S95: NO), the MFP 1 returns to the step S85. When the calling has terminated (S95: YES), the MFP 1 stores communication request time (time of day of the reception of the communication request) and the phone number of the calling party (as information representing the calling party) in the absent call reception history memory 14*d* as an absent call reception history record (S96).

Subsequently, the MFP 1 displays the absent call reception history screen 57 on the LCD 16 instead of the call reception screen 56 (S97) and ends the call reception process of FIG. 11. In this case where the absent call reception history screen 57 is displayed on the LCD 16 (S97), the photo (image) to be displayed in the display area 57*a* first is selected according to the same rules as the aforementioned steps S81-S83 and S87-S94.

As described above, with the MFP 1 in accordance with the first embodiment of the present invention, when it is necessary to associate the same personal information PD with two or more photos (images, image data), the association of the personal information PD with a latter photo (a photo (e.g. "coworkers") with which the personal information PD is associated later) can be carried out by use of (the same)

personal information PD already associated with another (former) photo (e.g. "friends"), by which the CPU 11 is allowed to recognize the identity of the personal information PD associated with the photos. Consequently, the management of personal information PD can be facilitated compared to cases where each piece of personal information PD is separately associated with each photo (in which the CPU 11 is incapable of recognizing the identity of personal information PD associated with two or more photos).

Further, since common personal information PD can be associated with two or more photos, the MFP 1 is capable of letting the user refer to two or more photos corresponding to (associated with) a piece of personal information PD when the personal information PD is specified. Therefore, the user is allowed to easily acquire additional information which can not be acquired from the personal information PD alone (e.g. personal connections) by viewing the two or more photos.

Furthermore, the MFP 1 is capable of letting the user specify an area that has been set in a photo and then displaying the personal information PD already associated with the specified area, which allows the user to carry out the search for desired personal information PD with ease.

Embodiment 2

Figure 12:
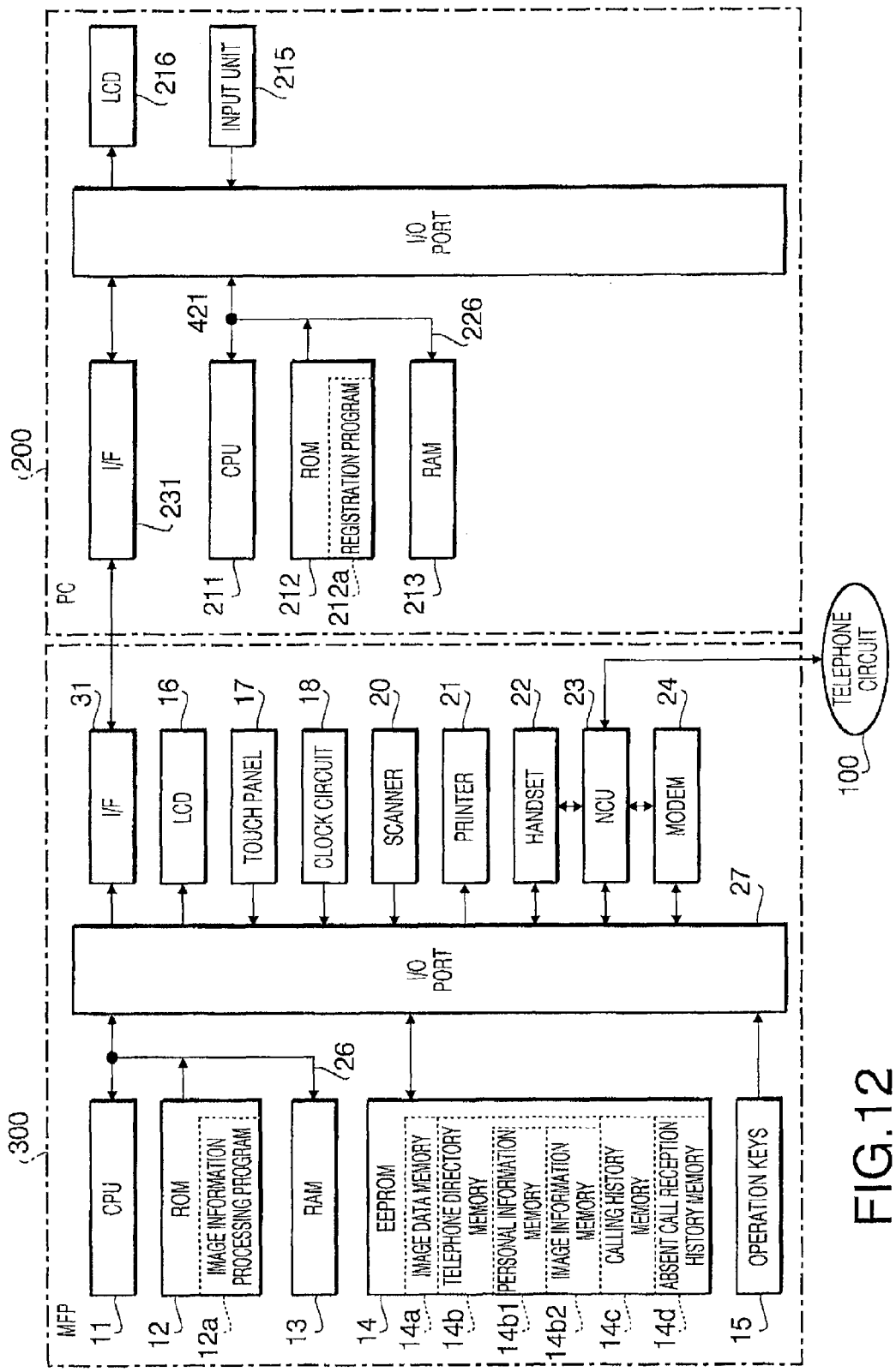
FIG. 12 is a block diagram showing the electrical configuration of an image information processing system in accordance with a second embodiment of the present invention.

FIG. 12 is a block diagram showing the electrical configuration of an image information processing system 500 in accordance with a second embodiment of the present invention. While the user in the first embodiment associates personal information PD with a photo (image, image data) by operating the MFP 1, the user in the second embodiment carries out the association of personal information PD with a photo (image, image data) by operating a PC (Personal Computer) 200 which is connected to the MFP 1. In the following explanation of the image information processing system 500, components identical with those in the first embodiment are assigned the same reference characters as those in the first embodiment and repeated explanation thereof is omitted for brevity.

As shown in FIG. 12, the image information processing system 500 is made up of the MFP 1 and the PC 200, which are connected together via an I/F (interface) 31 of the MFP 1, a communication cable and an I/F 231 of the PC 200.

The MFP 1 in the second embodiment has the same electrical configuration as that in the first embodiment except for the I/F 31. In the second embodiment, the image information processing program 12a is configured not to execute the process for associating personal information with a photo (i.e. the registration process (FIG. 5), the button generating process (FIG. 6) and the personal information registration process (FIG. 7)).

The PC 200 includes a CPU 211, a ROM 212, a RAM 213, an input unit 215 and an LCD 216 as its main components. The CPU 211, the ROM 212 and the RAM 213 are connected together by a bus line 226. The input unit 215 and the LCD 216 are connected to the bus line 226 via an I/O port 227.

The CPU 211 controls the components connected to the I/O port 227 and the functions of the PC 200 according to programs and data (fixed values) stored in the ROM 212 and the RAM 213 and various signals which are communicated via an NCU 223. The RAM 213 is a rewritable volatile memory for temporarily storing a variety of data during various operations of the PC 200.

The ROM 212 stores a control program to be executed by the CPU 211 and fixed value data to be referred to during the execution of the control program. The ROM 212 has a storage area storing a registration program 212a. The registration program 212a is a program for executing a process corresponding to the process executed by the MFP 1 in the first embodiment for associating personal information with a photo (registration process (FIG. 5), button generating process (FIG. 6), personal information registration process (FIG. 7)).

The input unit 215 is a unit for letting the user input information and instructions to the PC 200, which can include a keyboard and a mouse, for example. The input unit 215 may also be implemented as a touch panel which is formed integrally with the LCD 216.

In the second embodiment, a process corresponding to the registration process (FIG. 5), the button generating process (FIG. 6) and the personal information registration process (FIG. 7) is executed by the PC 200. Specifically, in the registration process, etc. in the second embodiment, each screen (51-54, etc.) is displayed on the LCD 216 of the PC 200, and each instruction is inputted by the user by operating the input unit 215 instead of touching the screen with a pointer (finger, stylus, etc.). Incidentally, the photo to be displayed on each screen (51-54, etc.) is read out from the image data memory 14a of the MFP 1 and the information registered in the telephone directory is stored in the telephone directory memory 14b (personal information memory 14b1, image information memory 14b2) of the MFP 1 similarly to the first embodiment.

With the above image information processing system 500 in accordance with the second embodiment of the present invention, when it is necessary to associate the same personal information PD with two or more photos, the association of the personal information PD with a latter photo (a photo with which the personal information PD is associated later) can be carried out by use of (the same) personal information PD already associated with another (former) photo, similarly to the MFP 1 of the first embodiment. Thus, the image information processing system 500 of this embodiment has the same advantages as the MFP 1 of the first embodiment.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

For example, while the user is allowed to refer to multiple photos (images) corresponding to (associated with) a piece of personal information PD by specifying the piece of personal information PD, it is also possible to let the user refer to a piece of personal information PD that is common to multiple photos (by associating common personal information PD with multiple photos). With the possibility of referring to personal information PD common to multiple photos, the user can acquire additional information (which can not be acquired from one photo alone) with ease.

In such cases where the user refers to multiple photos corresponding to (associated with) a piece of personal information PD or the user refers to personal information PD common to multiple photos, the personal information PD and the photos are outputted to the LCD 16 of the MFP 1 in the above embodiment. However, the personal information PD and the photos may also be outputted to a different device, such as the printer 21 of the MFP 1, the display of an external device connected to the MFP 1 (e.g. the LCD 216 of the PC 200) or a printer which is connected to an external device (e.g. PC 200) connected to the MFP 1.

While an area which has been set in a photo is specified (selected) by the user by touching the area in the photo displayed on the LCD 16 (formed integrally with the touch panel 17) in the above embodiments, the specification (selection) of an area set in a photo may also be made by surrounding (with a pen, marker, etc.) a desired area (intended for the specification) in the photo printed out by the printer and then scanning the marked photo with the scanner. The specification (selection) may also be made by use of a cursor, pointer, etc. which can be moved on the photo displayed on the LCD 16 by operating the operation keys 15, etc.

While personal information PD (information on a person) is associated with a photo in the above embodiments, the information associated with a photo is not restricted to personal information PD; a variety of necessary information (e.g. information on a device, object, natural object, etc. included in the photo) may be associated with the photo. Further, the target with which the personal information PD is associated is not restricted to a photo; the personal information PD may also be associated with various types of image data (e.g. graphics of a painting, a character, etc.).

While a person (face) included in a photo is set as an area to be associated with personal information PD in the above embodiments, the area set in a photo is not restricted to a person; an arbitrary area in a photo can be set as an area to be associated with personal information PD.

While a piece of personal information PD is associated with an area in the above embodiments, two or more pieces of personal information PD may be associated with an area. For example, when a house is included in a photo as a subject, it is possible to set the house as an area and associate multiple pieces of personal information PD (on all family members living in the house, for example) with the area.

In the above embodiments, the telephone directory memory 14*b* is made up of the personal information memory 14*b*1 (storing the personal information PD) and the image information memory 14*b*2 (storing the image name Q1 and the personal number P1 corresponding to the personal information PD stored in the personal information memory 14*b*1). With such a data configuration, wastage (useless consumption) of the storage area of the EEPROM 14 can be reduced even when the same personal information is associated with multiple pieces of image data.

However, the data configuration of the telephone directory memory is not restricted to the above configuration. FIGS. 13A and 13B are schematic diagrams showing an example of the configuration of data stored in a telephone directory memory 140*b* as a modification of the telephone directory memory 14*b*.

As shown in FIGS. 13A and 13B, the telephone directory memory 140*b* is configured to be capable of storing area information R2, personal information PD (including a name R3, a phone number R4, etc.) and a personal number R5 for each piece of image data which is specified by an image name R1.

When a piece of personal information PD is associated with a photo (e.g. "friends") for the first time, the personal information PD is stored in a data area of the telephone directory memory 140*b* associated with the image data (photo) specified by the image name R1 "friends", for example (as shown in the line L1 in FIG. 13A).

On the other hand, when a piece of personal information PD that should be associated with a photo (e.g. "coworkers") has already been associated with a different photo (e.g. "friends"), the personal information PD is not stored in a data area of the telephone directory memory 140*b* associated with the image data (photo) specified by the image name R1 "coworkers", as shown in the line L2 in FIG. 13B. However, the personal information PD can be referred to in a data area of the telephone directory memory 140*b* associated with the image data (photo) specified by the image name R1 "friends", by use of the personal number "A1" (personal number R5 in the line L2).

As above, also with the data configuration shown in FIGS. 13A and 13B, wastage (useless consumption) of the storage area of the EEPROM 14 can be reduced even when the same personal information is associated with multiple pieces of image data.

While the personal information PD, the area information Q2, etc. are stored in the telephone directory memory 14*b* separately from the image data stored in the image data memory 14*a* in the above embodiments, it is also possible to store the personal information PD, the area information Q2, etc. in the header of the image data. In cases where the same personal information is associated with multiple pieces of image data, personal information PD already associated with a different piece of image data can be referred to by use of identification information such as the personal number P1.

While the user is allowed to set a desired area in the displayed photo by selecting the shape of the area and enlarging/reducing and moving the selected area by use of the button generating screen 52 in the above embodiments, the setting of the area may be made without using the button generating screen 52. For example, the user may be allowed to set a desired area in the displayed photo by tracing (surrounding) the area with a pointer (finger, stylus, etc.).

In the above embodiments, an area in the displayed photo corresponding to the other party (calling party, called party) is highlighted on the calling screen 55, call reception screen 56, absent call reception history screen 57, etc. by displaying the area in a specific display style (e.g. blinking) distinguishable from the other areas. The display style for making the area (corresponding to the other party) distinguishable from the other areas can include a wide variety of styles (blinking, coloring, high-brightness display, etc.).

In cases where two or more areas in the displayed photo have been associated with personal information PD, an area corresponding to the other party may be displayed in a specific display style (e.g. changing color) distinguishable from the other areas associated with personal information PD.

In cases where a photo including both the calling party (sending a communication request) and a different person already recorded in an absent call reception history record in the absent call reception history memory 14*d* is displayed on the call reception screen 56, the area associated with the calling party and the area associated with the different person (recorded in an absent call reception history record) may be displayed in different display styles. With such a display method, the amount of information regarding the calling party sending the communication request is increased (by comparison between the area associated with the calling party and the area associated with the different person recorded in an absent call reception history record), which allows the user to deepen his/her understanding of the calling party.

In the aforementioned call reception process (FIG. 11), when there are two or more photos associated with the calling party sending the communication request (S89: YES), whether a group photo is included in the photos (associated with the calling party) or not is checked (S90) in the above embodiments. However, it is also possible to leave out the step S90 and display one of the photos (associated with the calling party) that was registered in the telephone directory memory 14*b* first (irrespective of whether the photo is a group photo or not) on the call reception screen 56 when there are two or more photos associated with the calling party.

What is claimed is:

1. An image information storage device, comprising:
   an image data storage unit which stores image data;
   a registration information storage unit;
   a registration control unit which stores registration information in the registration information storage unit while associating the registration information with the image data stored in the image data storage unit according to an input specifying the association of the registration information with the image data;
   an output control unit which makes an output unit output an image and/or information,
   wherein:
   when the output control unit makes the output unit output an image represented by first image data stored in the image data storage, the output control unit makes the output unit also output the registration information which has been associated with the first image data, or
   when the output control unit makes the output unit output first registration information stored in the registration information storage unit, the output control unit makes the output unit also output an image represented by image data which has been associated with first registration information;
   a display screen which functions as the output unit; and
   a communication unit configured to communicate with a communication device, and
   wherein:
   when there is an input specifying association of the first registration information which has already been stored in the registration information storage unit with second image data, the registration control unit associates the first registration information with the first image data and the second image data, and stores in the registration information storage unit,
   the registration information storage unit stores the registration information while associating with area information, which represents an area included in the image represented by the image data, and with the communication device, and
   when a communication request is received from a first communication device, the output control unit makes the display screen display a first image, represented by image data which has been associated with the first registration information representing the first communication device, while making the display screen display an area in the image, which area is represented by area information which has been associated with the first registration information, in a first display style different from that of other areas, and
   when an instruction for responding to the communication request is inputted while the first mage is displayed by the display screen, the communication unit responds to the communication request and starts the communication with the first communication device.

2. The image information storage device according to claim 1, wherein:
   in accordance with an input specifying an area within an image represented by the image data with which the registration information is associated, the registration control unit stores the registration information in the registration information storage unit while associating the registration information with the image data and area information which represents specified area, and
   when there is an input specifying a first area within an image outputted by the output unit, the output control unit makes the output unit output registration information which has been associated with the area information representing the first area.

3. The image information storage device according to claim 1, wherein the registration information storage unit includes:
   a first storage unit which stores the registration information and identification information representing the registration information while associating them with each other; and
   a second storage unit which stores the identification information stored in the first storage unit while associating the identification information, representing the registration information associated with the identification information, with image data stored in the image data storage unit.

4. The image information storage device according to claim 1, wherein:
   the registration information storage unit stores identification information or registration information previously associated with the identification information while associating the identification/registration information with image data, and
   when there is an input specifying association of the first registration information, already stored in the registration information storage unit while being associated with the first image data, with the second image data, the registration control unit associates the identification information, which has been associated with the first registration information, with the second image data.

5. The image information storage device according to claim 1, further comprising:
   a touch panel capable of detecting a position on the display screen specified with a pointer;
   a communication device information inputting unit which inputs communication device information specifying a communication device to the communication unit; and
   a communication starting unit which starts communication with a first communication device specified by the communication device information when the communication device information is inputted to the communication unit by the communication device information inputting unit, wherein:
   the registration information includes the communication device information, and
   the registration information storage unit stores the registration information while associating it with area information representing an area included in the image represented by the image data, and
   in a communication starting mode for starting the communication with a communication device, the output control unit makes the display screen display an image represented by the image data which has been associated with the first registration information, and
   when a position in the image displayed by the display screen, specified with the pointer, is detected by the touch panel and the specified position is in an area represented by the area information associated with the first registration information, the output control unit makes the display screen display the first registration information, and
   when a communication start instruction is inputted while the first registration information is displayed by the display screen, the communication device information inputting unit inputs the communication device information, which is included in the first registration information, to the communication unit.

6. The image information storage device according to claim 1, wherein:
- when a communication request is received from the first communication device, the output control unit makes the display screen display the first image represented by first image data which has been associated with the first registration information representing the first communication device and
- when registration information has been associated with the first image data, the output control unit makes the display screen display an area in the first image, represented by area information which has been associated with the first registration information representing the first communication device, in a display style different from that of the second area represented by area information which has been associated with registration information other than the first registration information.

7. The image information storage device according to claim 1, wherein:
- in a registration mode for storing registration information in the registration information storage unit, the output control unit makes the output unit output the first image represented by first image data registered in the image data storage unit and a first menu image for receiving an input for selecting registration information already associated with second image data, and
- when an input for specifying setting of an area in the image represented by the piece of image data and an input for selecting first registration information from registration information associated with second image data are received via the first menu image, the registration control unit associates area information representing the area with the first registration information.

8. The image information storage device according to claim 1, wherein:
- in a registration mode for storing first registration information in the registration information storage unit, the output control unit makes the display screen display the first image represented by first image data stored in the image data storage unit and a second menu image for receiving inputs for specifying/selecting size and shape of a first area to be set in the first image, and
- when the inputs for specifying/selecting the size and shape of the first area are received via the second menu image and an input for specifying the position of the first area is received, the output control unit makes the display screen display a sub-image in the specified/selected size and shape while overlaying the sub-image on the first image and placing the sub-image at the specified position, and when there is an input for specifying registration of the first registration information while the sub-image is being displayed, the registration control unit stores the registration information in the registration information storage unit while associating the registration information with area information representing the first area.

* * * * *